(12) United States Patent
Yamada et al.

(10) Patent No.: US 7,756,528 B2
(45) Date of Patent: Jul. 13, 2010

(54) AREA ESTIMATION SYSTEM AND AREA ESTIMATION METHOD

(75) Inventors: Naoharu Yamada, Yokohama (JP); Yoshinori Isoda, Yokohama (JP); Akira Yamada, Yokohama (JP); Satoshi Tanaka, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 583 days.

(21) Appl. No.: 11/626,676

(22) Filed: Jan. 24, 2007

(65) Prior Publication Data

US 2007/0178922 A1    Aug. 2, 2007

(30) Foreign Application Priority Data

| Jan. 24, 2006 | (JP) | ............................. P2006-015408 |
| Feb. 23, 2006 | (JP) | ............................. P2006-047384 |
| May 12, 2006 | (JP) | ............................. P2006-134201 |
| Sep. 29, 2006 | (JP) | ............................. P2006-269419 |

(51) Int. Cl.
*H04W 24/06* (2009.01)
*H04Q 7/20* (2006.01)

(52) U.S. Cl. .................................... 455/456.1; 342/450

(58) Field of Classification Search ... 455/456.1–456.6, 455/457; 342/450–451
See application file for complete search history.

(56) References Cited

U.S. PATENT DOCUMENTS

| 6,140,964 | A | 10/2000 | Sugiura et al. | |
| 6,526,283 | B1 | 2/2003 | Jang | |
| 7,336,961 | B1 * | 2/2008 | Ngan | ....................... 455/456.1 |
| 2001/0000959 | A1 * | 5/2001 | Campana, Jr. | ............. 340/573.1 |

(Continued)

FOREIGN PATENT DOCUMENTS

JP    9-311184    12/1997

(Continued)

OTHER PUBLICATIONS

Tomoaki Ogawa, et al., "A New In-door Location Detection Method Adopting Learning Algorithms", Proceedings of the First IEEE International Conference on Pervasive Computing and Communications (PerCom'03), Computer Society, 2003, 6 Pages.

(Continued)

*Primary Examiner*—Lee Nguyen
(74) *Attorney, Agent, or Firm*—Oblon, Spivak, McClelland, Maier & Neustadt, L.L.P.

(57) ABSTRACT

An area estimation system includes: a radio signal transmitting unit configured to transmit a radio signal to certain radio signal receiving terminal; a radio signal capturing unit configured to capture the radio signal transmitted from the radio signal transmitting unit, to obtain an RSSI for indicating a strength of the captured radio signal; an RSSI receiver unit configured to receive the RSSI, a radio signal transmitting unit ID for uniquely identifying the radio signal transmitting unit, and a radio signal capturing unit ID for uniquely identifying the radio signal capturing unit; an RSSI storage unit configured to store the RSSI, the radio signal transmitting unit ID and the radio signal capturing unit ID in association with one another; and a presence area estimating unit configured to estimate the presence area of the radio signal transmitting unit, by using the RSSI which is obtained by the radio signal capturing unit and stored in the RSSI storage unit.

16 Claims, 23 Drawing Sheets

U.S. PATENT DOCUMENTS

| | | |
|---|---|---|
| 2004/0095276 A1 | 5/2004 | Krumm et al. |
| 2006/0030270 A1* | 2/2006 | Cheng ..................... 455/67.11 |
| 2006/0068775 A1* | 3/2006 | Wu et al. ................. 455/426.2 |

FOREIGN PATENT DOCUMENTS

| | | |
|---|---|---|
| JP | 10-228502 | 8/1998 |
| JP | 11-74835 | 3/1999 |
| JP | 2000-32535 | 1/2000 |
| JP | 2000-358281 | 12/2000 |
| JP | 2003-9214 | 1/2003 |
| JP | 2003-153334 | 5/2003 |
| JP | 2003-158759 | 5/2003 |
| JP | 2003-203287 | 7/2003 |
| JP | 2003-348001 | 12/2003 |
| JP | 2004-312079 | 11/2004 |
| JP | 2004-364167 | 12/2004 |
| JP | 2005-337990 | 12/2005 |
| WO | WO 03/021851 A2 | 3/2003 |
| WO | WO 03/102893 A1 | 12/2003 |
| WO | WO 2004/008795 A1 | 1/2004 |
| WO | WO 2004/019559 A2 | 3/2004 |

OTHER PUBLICATIONS

Masayuki Ono, et al., "Wireless Position Detection", Ubiquitous network, Oki Technical Review, Oki Electric Industry Co., Ltd., vol. 72, No. 4, Oct. 1, 2005, pp. 24-27 with English translation.

* cited by examiner

FIG. 4

| RADIO SIGNAL TRANSMITTING TERMINAL ID | TOTING USER'S NAME |
|---|---|
| 00:11:22:33:44:A1 | SUZUKI |
| 00:11:22:33:44:A2 | YOSHIDA |

FIG. 5

| RADIO SIGNAL TRANSMITTING TERMINAL ID | RADIO SIGNAL CAPTURING TERMINAL ID | RSSI | OBTAINING TIME |
|---|---|---|---|
| 00:11:22:33:44:A1 | 00:11:22:33:44:01 | -50 | 2005-11-1-08:01:50:10 |
| 00:11:22:33:44:A1 | 00:11:22:33:44:02 | -40 | 2005-11-1-08:01:50:10 |
| 00:11:22:33:44:A1 | 00:11:22:33:44:03 | -46 | 2005-11-1-08:01:50:11 |
| 00:11:22:33:44:A1 | 00:11:22:33:44:01 | -49 | 2005-11-1-08:01:50:10 |
| 00:11:22:33:44:A2 | 00:11:22:33:44:02 | -53 | 2005-11-1-08:01:50:10 |
| 00:11:22:33:44:A2 | 00:11:22:33:44:03 | -38 | 2005-11-1-08:01:50:11 |

FIG. 6

| RADIO SIGNAL TRANSMITTING TERMINAL ID | RADIO SIGNAL CAPTURING TERMINAL ID | ESTIMATION TIME |
|---|---|---|
| 00:11:22:33:44:A1 | 00:11:22:33:44:02 | 2005-11-1-08:01:50:11 |
| 00:11:22:33:44:A2 | 00:11:22:33:44:03 | 2005-11-1-08:01:50:11 |

FIG. 8

| RADIO SIGNAL TRANSMITTING TERMINAL ID | IP ADDRESS | TOTING USER'S NAME |
|---|---|---|
| 00:11:22:33:44:A1 | 172.21.2.1 | SUZUKI |
| 00:11:22:33:44:A2 | 172.21.2.2 | YOSHIDA |

FIG. 9

| RADIO SIGNAL CAPTURING TERMINAL ID | IP ADDRESS | PRESENCE AREA |
|---|---|---|
| 00:11:22:33:44:01 | 172.21.1.1 | YAMADA'S SEAT |
| 00:11:22:33:44:02 | 172.21.1.2 | SUZUKI'S SEAT |
| 00:11:22:33:44:03 | 172.21.1.3 | YOSHIDA'S SEAT |

FIG. 12

| RADIO SIGNAL TRANSMITTING TERMINAL ID | NEAREST RADIO SIGNAL CAPTURING TERMINAL ID | CONFIDENCE FACTOR | ESTIMATION TIME |
|---|---|---|---|
| 00:11:22:33:44:A1 | 00:11:22:33:44:02 | 80 | 2005-11-1-08:01:50:11 |
| 00:11:22:33:44:A2 | 00:11:22:33:44:03 | 95 | 2005-11-1-08:01:50:11 |

FIG. 16A

| TOTING USER'S NAME | ESTIMATION FREQUENCY |
|---|---|
| YAMADA | 1s |
| COMPANY STAFF | 1s |
| VISITOR | 100s |
| OTHERS | 10s |

FIG. 16B

| PRESENCE AREA | ESTIMATION FREQUENCY |
|---|---|
| CANTEEN | 100s |
| HALLWAY | 1s |
| MEETING ROOM | 100s |
| OTHERS | 10s |

FIG. 17

| RADIO SIGNAL TRANSMITTING TERMINAL ID | TOTING USER'S NAME | CATEGORY |
|---|---|---|
| 00:11:22:33:44:A1 | SUZUKI | COMPANY STAFF |
| 00:11:22:33:44:A2 | YOSHIDA | VISITOR |

FIG. 18

| RADIO SIGNAL CAPTURING TERMINAL ID | PRESENCE AREA | CATEGORY |
|---|---|---|
| 00:11:22:33:44:11 | 101 MEETING ROOM | MEETING ROOM |
| 00:11:22:33:44:12 | CANTEEN ON SECOND FLOOR IN SECOND BUILDING | CANTEEN |
| 00:11:22:33:44:13 | 102 MEETING ROOM | MEETING ROOM |

FIG. 20

| RADIO SIGNAL TRANSMITTING TERMINAL ID | RADIO SIGNAL CAPTURING TERMINAL ID | REFERENCE RSSI |
|---|---|---|
| 00:11:22:33:44:A1 | 00:11:22:33:44:01 | -30 |
| 00:11:22:33:44:A1 | 00:11:22:33:44:02 | -20 |
| 00:11:22:33:44:A2 | 00:11:22:33:44:01 | -33 |
| 00:11:22:33:44:A2 | 00:11:22:33:44:02 | -21 |

FIG. 21

| RADIO SIGNAL CAPTURING TERMINAL ID | REFERENCE RSSI |
|---|---|
| 00:11:22:33:44:01 | -30 |
| 00:11:22:33:44:02 | -20 |

FIG. 22

| RADIO SIGNAL TRANSMITTING TERMINAL ID | RADIO SIGNAL CAPTURING TERMINAL ID | RSSI | REFERENCE RSSI | OBTAINING TIME |
|---|---|---|---|---|
| 00:11:22:33:44:A1 | 00:11:22:33:44:01 | −50 | −20 | 2005−11−1−08:01:50:10 |
| 00:11:22:33:44:A1 | 00:11:22:33:44:02 | −40 | −20 | 2005−11−1−08:01:50:10 |
| 00:11:22:33:44:A2 | 00:11:22:33:44:01 | −49 | −16 | 2005−11−1−08:01:50:10 |
| 00:11:22:33:44:A2 | 00:11:22:33:44:02 | −53 | −32 | 2005−11−1−08:01:50:10 |

FIG. 23

| RADIO SIGNAL TRANSMITTING TERMINAL ID | RADIO SIGNAL CAPTURING TERMINAL ID | RSSI | REFERENCE RSSI | OBTAINING TIME |
|---|---|---|---|---|
| 00:11:22:33:44:A1 | 00:11:22:33:44:01 | -50 | -20 | 2005-11-1-08:01:50:10 |
| 00:11:22:33:44:A1 | 00:11:22:33:44:02 | -40 | -20 | 2005-11-1-08:01:50:10 |
| 00:11:22:33:44:A2 | 00:11:22:33:44:01 | -49 | -19 | 2005-11-1-08:01:50:10 |
| 00:11:22:33:44:A2 | 00:11:22:33:44:02 | -53 | -33 | 2005-11-1-08:01:50:10 |

FIG. 25

| RADIO SIGNAL TRANSMITTING TERMINAL ID | RADIO SIGNAL CAPTURING TERMINAL ID | REFERENCE RSSI |
|---|---|---|
| 00:11:22:33:44:A1 | 00:11:22:33:44:01 | $e^{(RSSI-10)/5}$ |
| 00:11:22:33:44:A1 | 00:11:22:33:44:02 | $e^{(RSSI-8)/4}$ |
| 00:11:22:33:44:A2 | 00:11:22:33:44:01 | $e^{(RSSI-9)/5}$ |
| 00:11:22:33:44:A2 | 00:11:22:33:44:02 | $e^{(RSSI-7)/4}$ |

FIG. 26

| RADIO SIGNAL CAPTURING TERMINAL ID | REFERENCE RSSI |
|---|---|
| 00:11:22:33:44:01 | $e^{(RSSI-10)/5}$ |
| 00:11:22:33:44:02 | $e^{(RSSI-8)/4}$ |

AREA ESTIMATION SYSTEM AND AREA ESTIMATION METHOD

CROSS REFERENCE TO RELATED APPLICATION

This application is based upon and claims the benefit of priority from the prior Japanese Patent Application No. P2006-15408, filed on Jan. 24, 2006; and the prior Japanese Patent Application No. P2006-47384, filed on Feb. 23, 2006; the prior Japanese Patent Application No. P2006-134201, filed on May 12, 2006; and the prior Japanese Patent Application No. P2006-269419, filed on Sep. 29, 2006; the entire contents of which are incorporated herein by reference.

BACKGROUND OF THE INVENTION

1. Field of the Invention

The present invention relates to an area estimation system and an area estimation method.

2. Description of the Related Art

In recent years, users have been provided with many services relating to places where the users currently are.

For example, there is a service which allows users to share, as presence information, information on locations where they currently are. Another example of the services is a push-type information delivery which provides advertisements and information to a user who is staying at a certain location.

In order to provide such services relating to a user's location, it is necessary to successively know where the user currently is.

A location estimation apparatus has been known as a method for estimating a user's location. In a space equipped with a wireless LAN, the location estimation apparatus learns in advance an RSSI (Received Signal Strength Indicator) for indicating a strength of a radio signal which a wireless LAN device or the like possessed by a user receives from each access point in a wireless LAN network, and then estimates the user's location by using the learning result (refer to Gakushu Kino wo Mochiita Location Kenshutu Houhou no Kentou (Study on a method for detecting a location by using a learning function) (NTT, Tomoaki Ogawa, Shuichi Yoshino and Masashi Shimizu, the Institute of Electronics, Information and Communication Engineers, Shingakugihou NS2002-79); and International Patent Publication No. W02004-008795).

Moreover, another location estimation apparatus has been known which estimates the location of a wireless LAN device possessed by a user by using the RSSI measured at a wireless LAN base station, and which thus determines the user's location.

However, the location estimation apparatuses of the foregoing conventional techniques have the following problems.

Specifically, the location estimation apparatuses of the foregoing conventional techniques operate without considering the variation in the RSSI caused by the movement of a user and the like. In General, the RSSI varies due to the movements or the like of a structural object, furniture, people and things.

Since the structural object, the furniture and the like are hardly moved, the movements thereof do not cause the RSSI to vary from moment to moment.

On the other hand, since the people and the things frequently move, the movements thereof cause the RSSI to widely vary from moment to moment.

For this reason, it is difficult to estimate an accurate location, even if the RSSI at each area is learnt in advance as is the case with the foregoing conventional techniques. This is because there is a high possibility that the RSSI measured at an estimation time widely varies due to the movements of the people and the things.

The above-described literatures also describe a fact that the longer the distance between the base station and the location of a target for estimation, the more remarkable such characteristics.

Moreover, the location estimation apparatuses of the foregoing conventional techniques need to learn in advance RSSIs measured at intervals of about one meter for the purpose of estimating the location. This requires huge setting costs for the location estimation.

In addition, in a case where the location is estimated by using the RSSI measured at the wireless LAN base station, the longer the distance between the base station and a target, the more widely the RSSI varies and the more likely an error is to occur.

BRIEF SUMMARY OF THE INVENTION

The present invention has been made in view of the above points. An object of the present invention is therefore to provide an area estimation system and an area estimation method, which allow a user's location to be estimated without learning in advance RSSIs even in an environment where the RSSI frequently varies due to the movements of people and things.

A first aspect of the present invention is summarized as an area estimation system, including: a radio signal transmitting unit configured to transmit a radio signal to certain radio signal receiving terminal, a presence area of the radio signal transmitting unit being unknown; a radio signal capturing unit configured to capture the radio signal transmitted from the radio signal transmitting unit, to obtain an RSSI for indicating a strength of the captured radio signal, a presence area of the radio signal capturing unit being known; an RSSI receiver unit configured to receive the RSSI, a radio signal transmitting unit ID for uniquely identifying the radio signal transmitting unit, and a radio signal capturing unit ID for uniquely identifying the radio signal capturing unit; an RSSI storage unit configured to store the RSSI, the radio signal transmitting unit ID and the radio signal capturing unit ID in association with one another; and a presence area estimating unit configured to estimate the presence area of the radio signal transmitting unit, by using the RSSI which is obtained by the radio signal capturing unit and stored in the RSSI storage unit.

In the first aspect, when a plurality of radio signal capturing units capture a radio signal transmitted from the radio signal transmitting unit, the presence area estimating unit can be configured to estimate a presence area of the radio signal capturing unit obtaining the largest RSSI as the presence area of the radio signal transmitting unit.

In the first aspect, the area estimation system can further include a time manager unit configured to manage time information; and the RSSI storage unit can be configured to store the RSSI, the radio signal transmitting unit ID, the radio signal capturing unit ID, and time information for indicating a time when the radio signal capturing unit captures the radio signal, the time information obtained from the time manager unit.

In the first aspect, the presence area estimating unit can be configured to estimate the presence area of the radio signal transmitting unit, by using one or more RSSIs including a past record of the RSSI obtained by the radio signal capturing unit.

In the first aspect, the presence area estimating unit can be configured to estimate the presence area of the radio signal transmitting unit, by using the latest RSSI obtained by the radio signal capturing unit.

In the first aspect, the presence area estimating unit can be configured to estimate a presence area of the radio signal capturing unit obtaining the largest RSSI among the RSSIs obtained at the same time as or the nearest time to a time when the certain radio signal receiving terminal receives the radio signal, as the presence area of the radio signal transmitting unit.

In the first aspect, the area estimation system can further include an RSSI time variation comparing unit configured to calculate a time variation in a column of RSSIs of each radio signal transmitting unit which have been obtained by each of the radio signal capturing units; and the presence area estimating unit can be configured to estimate the presence area of the radio signal transmitting unit by using the time variation.

In the first aspect, the area estimation system can further include a confidence factor determining unit configured to calculate a feature quantity from a column of RSSIs of each radio signal transmitting unit which have been obtained by each of the radio signal capturing units, and to calculate a confidence factor for specifying a degree of difference in the feature quantity; and the presence area estimating unit can be configured to estimate the presence area of the radio signal transmitting unit by using the confidence factor.

In the first aspect, the area estimation system can further include an area estimation frequency determining unit configured to determine an area estimation frequency on the basis of any one of the presence area of the radio signal transmitting unit and attribute information on the radio signal transmitting unit.

In the first aspect, the area estimation system can further include: a staying-moving judgment unit configure to judge whether the radio signal transmitting unit is staying in an area or moving between areas, by using either a past record of the RSSI stored in the RSSI storage unit, or a past record of the presence area of the radio signal transmitting unit; and an RSSI-record-use number determining unit configured to determine the number of past records of the RSSIs to be used for the area estimation, on the basis of a judgment result of the staying-moving judgment unit, and the area estimation frequency determining unit can be configured to determine the area estimation frequency on the basis of the judgment result of the staying-moving judgment unit.

In the first aspect, the area estimation frequency determining unit can be configured to determine the area estimation frequency according to a variation in a confidence factor for specifying a degree of difference between feature quantities calculated from a column of the RSSIs of each radio signal transmitting unit obtained by each radio signal capturing unit.

In the first aspect, the area estimation system can further include an area estimation frequency storage unit configured to store the estimation frequency corresponding to at least one of the attribute information on the radio signal transmitting unit, the attribute information on the radio signal capturing unit, and the presence area of the radio signal transmitting unit; and the area estimation frequency determining unit can be configured to determine the area estimation frequency, by obtaining, from the area estimation frequency storage unit, the estimation frequency corresponding to at least one of the attribute information on the radio signal transmitting unit obtained from a radio signal transmitting means attribute information storage unit, the attribute information on the radio signal capturing unit obtained from a radio signal capturing terminal attribute information storage unit, and the presence area of the radio signal transmitting unit obtained from a radio signal transmitting unit presence area storage unit.

In the first aspect, the area estimation system can further include a relative RSSI determining unit configured to determine a reference RSSI for either a set of each radio signal transmitting unit and each radio signal capturing unit, or each of the radio signal capturing unit, by using past records of the RSSIs stored in the RSSI storage unit, to store the reference RSSI in a reference RSSI storage unit, and to determine, as a relative RSSI, a difference between the RSSI obtained by the radio signal capturing unit, and the reference RSSI; and the presence area estimation can be configure to estimate the presence area of the radio signal transmitting unit by using the relative RSSI.

In the first aspect, the area estimation system can further include a channel switcher unit configured to instruct the radio signal capturing unit to perform a detection on a plurality of channels by switching from one channel to another at certain intervals, when there are the plurality of channels used for the radio signal transmission from the radio signal transmitting unit to the radio signal receiving unit; the radio signal capturing unit can be configured to capture the radio signals transmitted respectively on the plurality of channels, and to obtains the one or more RSSIs of the radio signals; and the presence area estimating unit can be configured to estimate the presence area of the radio signal transmitting unit, by using the one or more RSSIs.

In the first aspect, the radio signal capturing unit can be configured to obtain a state of use of channels, on which communications can be made, to capture the radio signals by switching only the channels being in use from one channel to another at certain intervals, and to obtain the one or more RSSIs.

A second aspect of the present invention is summarized as an area estimation method for estimating a presence area of a radio signal transmitting unit by using a radio signal capturing unit, a presence area of the radio signal capturing unit being known, including: transmitting, at the radio signal transmitting unit, a radio signal to a certain radio signal receiving unit; capturing, at the radio signal capturing unit, the radio signal transmitted by the radio signal transmitting unit, and obtaining an RSSI for indicating a strength of the radio signal; storing the RSSI, a radio signal transmitting unit ID for uniquely identifying the radio signal transmitting unit, and a radio signal capturing unit ID uniquely for identifying the radio signal capturing unit, in association with one another; and estimating the presence area of the radio signal transmitting unit, by using the RSSI which is obtained by the radio signal capturing unit and stored.

BRIEF DESCRIPTION OF THE SEVERAL VIEWS OF THE DRAWINGS

FIG. 4 shows an example of information stored in a radio signal transmitting terminal attribution information storage of the first embodiment.

FIG. 5 shows an example of information stored in an RSSI storage of the first embodiment.

FIG. 6 shows an example of information stored in a radio signal transmitting terminal presence area storage of the first embodiment.

FIG. 8 shows an example of information stored in a radio signal transmitting terminal attribution information storage of the modified example of the area estimation system according to the first embodiment.

FIG. 9 shows an example of information stored in a radio signal capturing terminal attribution information storage of the modified example of the area estimation system according to the first embodiment.

FIG. 12 shows an example of information stored in a radio signal transmitting terminal presence area storage of the third embodiment.

FIGS. 16A and 16B show an example of information stored in an area estimation frequency storage of the fifth embodiment.

FIG. 17 shows an example of information stored in a radio signal transmitting terminal attribute information storage of the fifth embodiment.

FIG. 18 shows an example of the information stored in a radio signal capturing terminal attribute information storage of the fifth embodiment.

FIG. 20 shows an example of information stored in a reference RSSI storage of the 6th embodiment (part 1).

FIG. 21 shows an example of the information stored in the reference RSSI storage of the 6th embodiment (part 2).

FIG. 22 shows an example of information stored in an RSSI storage of the 6th embodiment (part 1).

FIG. 23 shows an example of the information stored in the RSSI storage of the 6th embodiment (part 2).

FIG. 25 shows an example of information stored in a reference RSSI storage of a modified example of the 6th embodiment (part 1).

FIG. 26 shows an example of the information stored in the reference RSSI storage of a modified example of the 6th embodiment (part 2).

DETAILED DESCRIPTION OF THE INVENTION

Figure 1:
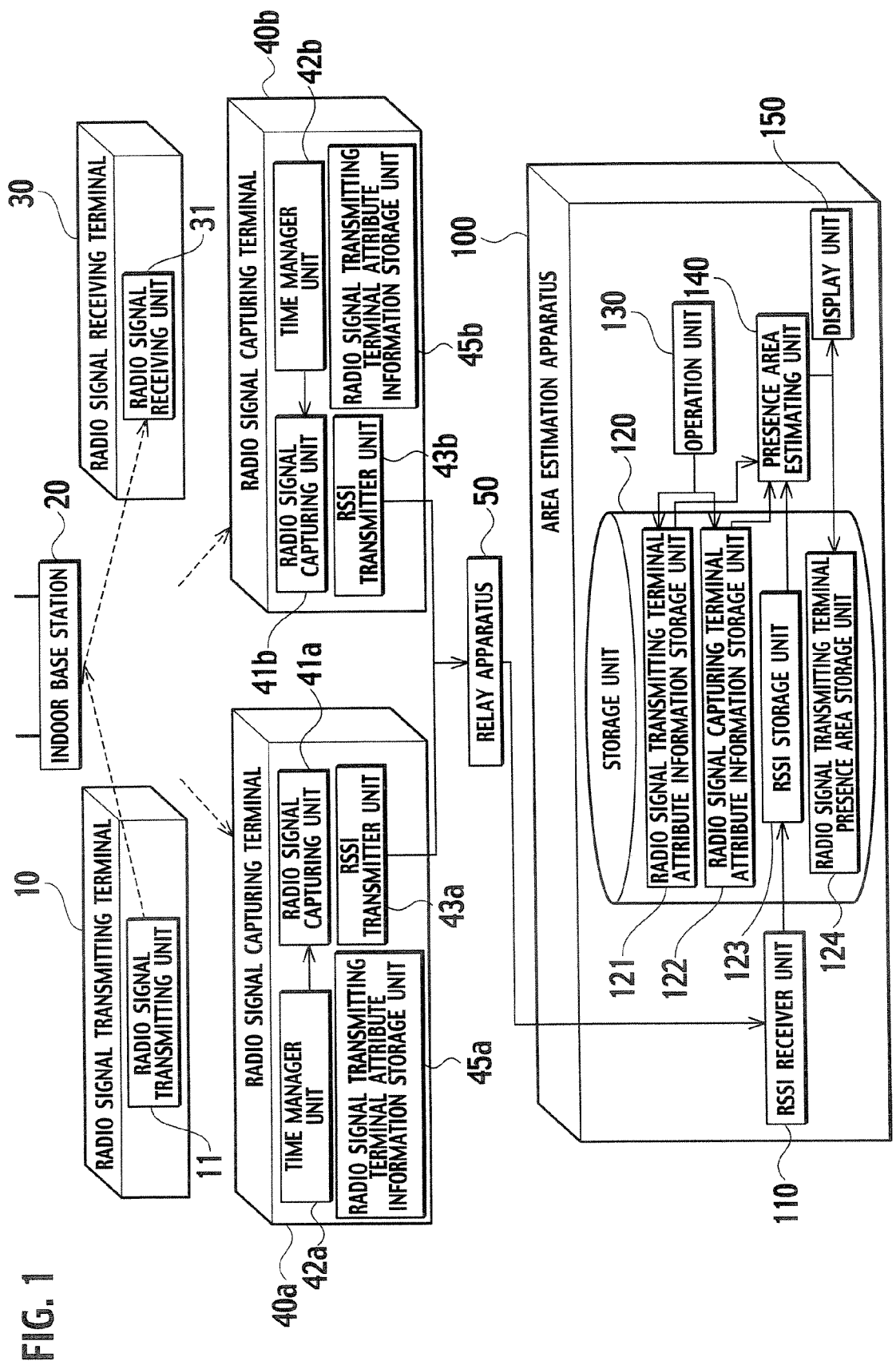
FIG. 1 is a configuration block diagram of an area estimation system of a first embodiment.

Hereinafter, descriptions will be given of embodiments of the present invention by referring to the accompanying drawings. In the following description of the drawings, the same or similar reference numerals are given to the units that are the same as or similar to those through the embodiments. It should be noted that all the drawings are schematic ones.

First Embodiment (Area Estimation System)

As shown in FIG. 1, an area estimation system of a first embodiment includes a radio signal transmitting terminal 10, an indoor base station 20, a radio signal receiving terminal 30, radio signal capturing terminals 40a and 40b, a relay apparatus 50 and an area estimation apparatus 100.

The radio signal transmitting terminal 10 includes a radio signal transmitting unit 11, and is physically configured of a computer, a PDA, a mobile phone, or the like; and a wireless LAN adaptor connected thereto.

The radio signal transmitting unit 11 is configured to transmit a radio signal to the radio signal receiving terminal 30. A mobile phone, a PDA or a laptop personal computer, which is always carried by a user, is effective when used as the radio signal transmitting terminal 10.

The radio signal receiving terminal 30 includes a radio signal receiving unit 31, and is physically configured of a computer and a wireless LAN adaptor connected thereto.

The radio signal receiving unit 31 is configured to receive a radio signal transmitted from the radio signal transmitting terminal 10. Incidentally, the radio signal receiving terminal 30 can additionally serve as the radio signal capturing terminals 40a and 40b.

The radio signal capturing terminals 40a and 40b respectively include radio signal capturing units 41a and 41b, time managers 42a and 42b, RSSI transmitters 43a and 43b, and radio signal transmitting terminal attribute information storages 45a and 45b.

Each of the radio signal capturing terminals 40a and 40b is physically configured of a computer and a wireless LAN adaptor connected thereto.

The radio signal capturing units 41a and 41b are configured to capture a radio signal transmitted from the radio signal transmitting terminal 10 to the radio signal receiving terminal 30, and to obtain the RSSI of the signal and a radio signal transmitting terminal ID uniquely identifying the radio signal transmitting terminal 10 which transmits the radio signal.

The time manager units 42a and 42b are configured to manage time information on the current time, and to transmit the time information in response to requests from the radio signal capturing units 41a and 41b.

The current time may be managed by performing a program which periodically synchronizes clocks of computers with one another.

Alternatively, the radio signal capturing terminals 40a and 40b may be configured to obtain the time information on the current time from an NTP server or the like.

The RSSI transmitter units 43a and 43b are configured to transmit, to the area estimation apparatus 100, the radio signal transmitting terminal ID, radio signal capturing terminal IDs, the RSSIs, and the RSSI obtaining times which are obtained by the radio signal capturing units 41a and 41b. The radio signal capturing terminal ID uniquely identifies one radio signal capturing terminal.

For example, an MAC address or the like which is assigned to the wireless LAN adaptor is used as the radio signal transmitting terminal ID and the radio signal capturing terminal ID.

A laptop or desktop personal computer which is hardly moved is effective when used as the radio signal capturing terminals 40a and 40b.

The radio signal transmitting terminal attribute information storage units 45a and 45b are configured to store a set of two data pieces (a radio signal transmitting terminal ID and a toting user's name).

A name of a user who is toting a radio signal transmitting terminal 10 is stored as the toting user's name.

Note that, as will be described in detail later, in a case where the radio signal capturing terminal 40a or 40b performs a later-described process for extracting a desired packet, the radio signal transmitting terminal attribute information storage units 45a and 45b are configured to store the attribute information on the radio signal transmitting terminal 10.

The indoor base station 20 is physically configured of a wireless access point. The indoor base station 20 is configured to relay a radio signal transmitted from the radio signal transmitting terminal 10, and transmits the radio signal to the radio signal receiving terminal 30.

The relay apparatus 50 is physically configured of a hub or a router. The relay apparatus 50 is configured to relay the radio signal transmitting terminal ID, the radio signal capturing terminal ID and the RSSI which are transmitted from the RSSI transmitter units 43a and 43b to the area estimation apparatus 100.

The area estimation apparatus 100 includes an RSSI receiver unit 110, a storage unit 120, an operation unit 130, a presence area estimation unit 140 and a display unit 150.

The area estimation apparatus 100 is physically configured of a computer and a wired or wireless LAN adaptor connected thereto.

The storage unit 120 includes a radio signal transmitting terminal attribute information storage unit 121, a radio signal capturing terminal attribute information storage unit 122, an RSSI storage unit 123 and a radio signal transmitting terminal presence area storage unit 124.

Note that the storage unit 120 may be configured of an internal storage device such as an RAM, or an external storage device such as a hard disk or a flexible dick.

The RSSI receiver unit 110 is configured to receive the radio signal transmitting terminal ID, the radio signal capturing terminal IDs, the RSSIs, and the RSSI obtaining times, which area transmitted from the RSSI transmitter units 43a and 43b, and then to store them in the RSSI storage unit 123.

The radio signal transmitting terminal attribute information storage unit 121 is configured to store a set of two data pieces (a radio signal transmitting terminal ID and a toting user's name).

A name of a user who is toting the radio signal transmitting terminal 10 is stored as the toting user's name.

The radio signal capturing terminal attribute information storage unit 122 is configured to store a set of two data pieces (a radio signal capturing terminal ID and a presence area).

A name of an area such as, for example, "Yamada's seat" or "Suzuki's seat" is stored as the presence area.

The RSSI storage unit 123 is configured to store a set of four data pieces (a radio signal transmitting terminal ID, a radio signal capturing terminal ID, an RSSI and an RSSI obtaining time).

The operation unit 130 is configured to allow information to be inputted, and the information is to be stored in the radio signal transmitting terminal attribute information storage unit 121 or the radio signal capturing terminal attribute information storage unit 122.

For example, the operation unit 130 is configured to allow an administrator to input the presence area in the radio signal capturing terminal attribute information storage unit 122, and the user's name in the radio signal transmitting terminal attribute information storage unit 121. A keyboard or a mouse is effective when used as the operation unit 130.

The presence area estimation unit 140 is configured to obtain, for each of the radio signal transmitting terminal IDs, at least one of RSSIs which are obtained by each of the radio signal capturing terminals for a certain fixed time period.

In a case where there are two or more RSSIs obtained by each of the radio signal capturing terminals, an average value of the RSSIs, a median value thereof and the largest value thereof are used as the RSSI.

The median value is the middle one when a set of values are arranged in ascending order (note that, if the number of the values is even, the median value is the average value of the two middle values).

Then, the presence area estimation unit 140 is configured to identify the radio signal capturing terminal obtaining the largest RSSI as the nearest radio signal capturing terminal, and to store the nearest radio signal capturing terminal ID in the radio signal transmitting terminal presence area storage unit 124, in association with the radio signal transmitting terminal ID and the latest time within the fixed time period when the estimation is performed (hereinafter, the latest time is referred to as an "estimation time").

In this way, in a case where the plural radio signal capturing units 41a and 41b capture the radio signal transmitted from the radio signal transmitting terminal 10, the presence area estimation unit 140 is configured to determine that the presence area of the radio signal transmitting terminal 10 is the same as that of the nearest radio signal capturing terminal, by using a plurality of RSSIs including past records thereof.

Alternatively, the presence area estimation unit 140 may be configured to estimate the presence area of the radio signal transmitting terminal 10, by using the latest RSSIs obtained by using the radio signal capturing units 41a and 41b instead of the past records of the RSSIs.

Moreover, the RSSI receiver unit 110 of the area estimation apparatus 100 may be configured to obtain, from the radio signal receiving terminal 30, the time when the radio signal receiving terminal 30 receives the radio signal from the radio signal transmitting terminal 10.

In this case, the presence area estimation unit 140 may be configured to determine that the presence area of the radio signal transmitting terminal 10 is the same as that of one of the radio signal capturing terminals 40a and 40b that obtains the largest RSSI at the same time as, or the nearest time to a time when the radio signal receiving terminal 30 receives the radio signals.

After that, from the radio signal transmitting terminal attribute information storage unit 121 and the radio signal capturing terminal attribute information storage unit 122, the presence area estimation unit 140 is configured to obtain the toting user's name of the radio signal transmitting terminal and the presence area of the nearest radio signal capturing terminal.

Then, the presence area estimation unit 140 is configured to cause the display unit 150 to display the toting user's name and the presence area, thus obtained, in association with the estimation time.

The radio signal transmitting terminal presence area storage unit 124 is configured to store a set of three data pieces (a radio signal transmitting terminal ID, a radio signal capturing terminal ID and an estimation time).

The display unit 150 is configured to display the estimation time and the presence area of the radio signal transmitting terminal which is estimated by the presence area estimation unit 140.

A liquid crystal display (LCD) device, a light-emitting diode panel or an electroluminescence panel can be used as the display unit 150.

(Area Estimation Method)

Hereinafter, descriptions will be given of an area estimation method of the first embodiment by using FIG. 2.

Firstly, for the purpose of operating the area estimation apparatus 100 of the first embodiment, the attribute information on a terminal is registered (S101).

To be more precise, an administrator registers the MAC addresses and the presence areas respectively of the radio signal capturing terminals 40a and 40b in the radio signal capturing terminal attribute information storage unit 122 via the operation unit 130.

Figures 2, 3:
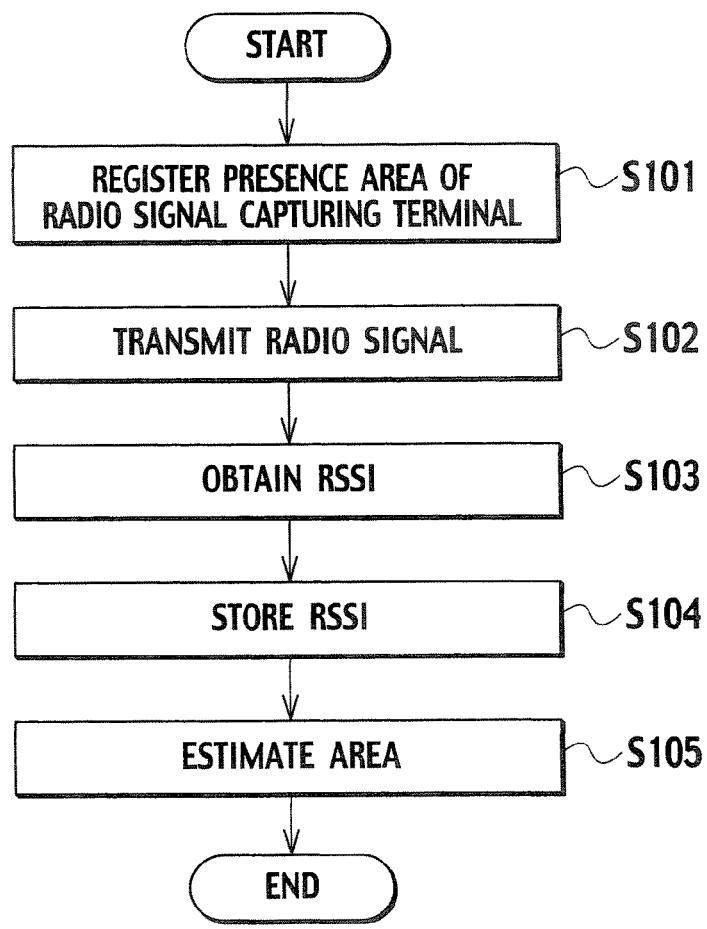
FIG. 2 is a flowchart showing an area estimation method of the first to third embodiments.
FIG. 3 shows an example of information stored in a radio signal capturing terminal attribution information storage of the first embodiment.

FIG. 3 shows an example of the radio signal capturing terminal attribute information stored in the radio signal capturing terminal attribute information storage unit 122.

In addition, the administrator registers the MAC address and the toting user's name of the radio signal transmitting terminal 10 in the radio signal transmitting terminal attribute information storage unit 121.

FIG. 4 shows an example of the radio signal transmitting terminal attribute information stored in the radio signal transmitting terminal attribute information storage unit 121.

In a case where the radio signal capturing terminals 40a and 40b perform the later-described process for extracting a desired packet, the attribute information on the radio signal transmitting terminal registered here is also registered in each of the radio signal transmitting terminal attribute information storage units 45a and 45b of the radio signal capturing terminals 40a and 40b, and this registration is performed, triggered by the process for registering the attribute information on the radio signal transmitting terminal to the radio signal transmitting terminal attribute information storage unit 121.

Subsequently, the radio signal transmitting terminal 10 transmits a radio signal (S102).

Specifically, the radio signal transmitting terminal 10 transmits an ICMP Echo Request packet to the radio signal receiving terminal 30.

Here, the area estimation apparatus 100 or the radio signal capturing terminals 40a and 40b may additionally serve as the radio signal receiving terminal 30.

The radio signal transmitting terminal 10 may periodically transmit the ICMP Echo Request packet at intervals of T0 seconds, or may transmit it Ndp times at short-cycle intervals of T2 seconds in each long cycle of T1 seconds.

Alternatively, an explicit operation such as an operation in which a user pushes a button may trigger the ICMP Echo Request packet to be transmitted.

Then, the radio signal capturing terminals 40a and 40b capture the ICMP Echo Request packet transmitted from the radio signal transmitting terminal 10, and obtain packet information and the RSSIs thereof (S103).

The RSSI can be obtained by accessing a device driver of a wireless LAN card. In the case of Windows (registered trademark), the RSSI can be obtained from an NDIS wireless LAN card by using a function such as DeviceIoControl. In the case of Linux, the RSSI can be obtained by reading a concerned file in the Procfilesystem.

Packets other than the ICMP Echo Request packet transmitted from the radio signal transmitting terminal 10 also travel on the wireless network. For this reason, it is necessary to extract a desired packet from the captured packets.

This extracting process may be performed by the area estimation apparatus 100, or by the radio signal capturing terminals 40a and 40b. The following describes a case where the radio signal capturing terminals 40a and 40b perform the extracting process.

In a case of an infrastructure mode, requirements for a packet to be extracted are that, in an IP layer, the IP address of a packet transmitting terminal and the IP address of a packet destination terminal respectively are the IP address of the radio signal transmitting terminal 10 and the IP address of the radio signal receiving terminal 30, and that, in a MAC layer, the MAC address of the packet transmitting terminal and the MAC address of the packet destination terminal respectively are the MAC address of the radio signal transmitting terminal 10 and the MAC address of the access point.

On the other hand, in a case of an ad hoc mode, requirements for a packet to be extracted are that, in the MAC layer, the MAC address of a packet transmitting terminal and the MAC address of a packet destination terminal respectively are the MAC address of the radio signal transmitting terminal 10 and the MAC address of the radio signal receiving terminal 30.

Although it suffices that the process for extracting only a desired packet from the packet information be performed on packets outputted from the device driver, it is more desirable to perform this extracting process in the device driver.

However, if the number of the radio signal transmitting terminals is enormous, it is difficult to hold all the needed information in the device driver.

In this case, it is desirable to firstly extract packets by using the MAC addresses of destination terminals, and then to extract packets by using the MAC addresses of transmitting terminals, in the device driver.

Next, the area estimation apparatus 100 stores the RSSIs obtained from the radio signal capturing terminals 40a and 40b (S104).

Specifically, the radio signal capturing terminals 40a and 40b respectively transmit, from the RSSI transmitter units 43a and 43b to the area estimation apparatus 100 through a wired network, the attribute information on the radio signal transmitting terminal 10; the RSSIs of the packet transmitted from the radio signal transmitting terminal 10; the MAC addresses uniquely identifying the radio signal capturing terminals 40a and 40b respectively; and the RSSI obtaining times obtained respectively from the time manager units 42a and 42b.

In the area estimation apparatus 100, the RSSI receiver unit 110 receives the radio signal transmitting terminal ID, the radio signal capturing terminal ID, the RSSI and the obtaining time, and the RSSI storage unit 123 stores the four data pieces.

In a case where the area estimation apparatus 100 performs the foregoing process for extracting a desired packet, this extracting process is performed before the RSSI storage unit 123 stores the four data pieces. FIG. 5 shows an example of information on the RSSIs stored in the RSSI storage unit 123.

Subsequently, the area estimation apparatus 100 estimates the presence area of the radio signal transmitting terminal 10 on the basis of the RSSIs thus obtained.

To be more precise, from the RSSI storage unit 123, the presence area estimation unit 140 obtains the RSSIs which the radio signal capturing terminals 40a and 40b obtain in the last N seconds before the current time.

This obtaining is carried out either periodically, or triggered by an event where new information on an RSSI is stored in the RSSI storage unit 123. Here, N is set so that each of the radio signal capturing terminals 40a and 40b can obtain at least one RSSI.

In a case where any one of the radio signal capturing terminals 40a and 40b obtain a plurality of RSSIs, the presence area estimation unit 140 calculates the average value, the median value and the largest value, and uses them as the RSSI of the radio signal capturing terminals 40a and 40b respectively.

Thereafter, the presence area estimation unit 140 compares the RSSIs of the radio signal capturing terminals 40a and 40b with one another, and determines that the nearest radio signal capturing terminal is the radio signal capturing terminal obtaining the largest RSSI.

Then, the presence area estimation unit 140 causes the radio signal transmitting terminal ID, the nearest radio signal capturing terminal ID and the estimation time to be stored in the radio signal transmitting terminal presence area storage unit 124.

FIG. 6 shows an example of estimated area information stored in the radio signal transmitting terminal presence area storage unit 124.

The example of FIG. 6 show a case where: the areas are estimated by using the RSSIs stored in the RSSI storage unit 123 shown in FIG. 5; the estimation is started at a time, 2005-11-1-08:01:50:11; and N is 2.

In this case, the nearest radio signal capturing terminal is identified by using the RSSIs obtained for a period from 2005-11-1-08:01:50:10 to 2005-11-1-08:01:50:11.

Moreover, the presence area estimation unit 140 obtains the toting user's name of the radio signal transmitting terminal 10 and the presence area of the nearest radio signal capturing terminal from the radio signal transmitting terminal attribute information storage unit 121 and the radio signal capturing terminal attribute information storage unit 122, and causes the toting user's name and the presence area to be displayed on the display unit 150.

In this case, the display unit 150 shows "Mr. Suzuki— Suzuki's seat" and "Mr. Yoshida—Yoshida's seat".

In addition, the area estimation apparatus 100 may estimate the presence area of the radio signal transmitting terminal 10 by using the latest RSSIs obtained by the radio signal capturing units 41a and 41b instead of the past records.

For example, in a case of the RSSIs stored in the RSSI storage unit 123 shown in FIG. 5, the presence area of the radio signal transmitting terminal 10 is estimated by using the RSSIs at 2005-11-1-08:01:50:11 which is the latest time.

Furthermore, from the radio signal receiving terminal 30, the area estimation apparatus 100 may also obtain a time when the radio signal receiving terminal 30 receives the radio signal from the radio signal transmitting terminal 10.

In this case, the area estimation apparatus 100 may determine that the presence area of the radio signal transmitting terminal 10 is the same as that of one of the radio signal capturing terminals 40a and 40b that obtains the largest RSSI at the same time as, or the nearest time to a time when the radio signal receiving terminal 30 receives the radio signal.

(Effects)

According to the area estimation system and the area estimation method of the first embodiment, the radio signal capturing units 41a and 41b capture the radio signal transmitted from the radio signal transmitting unit 11, which is a target for area estimation, to the radio signal receiving unit 31, and thus obtain the RSSIs.

Then, the RSSIs obtained by the radio signal capturing units 41a and 41b are compared with one another, and it is determined that the presence area of the radio signal transmitting terminal 10 is the same as that of the radio signal capturing unit judged as the nearest one.

This makes it possible to estimate the presence area of the radio signal transmitting terminal 10 without learning in advance in an environment where RSSIs frequently vary due to the movements of people and things.

In a case where the plurality of radio signal capturing units 41a and 41b capture the radio signal from the radio signal transmitting unit 11, the presence area estimation unit 140 determines that the presence area of the radio signal transmitting terminal 10 is the same as that of one of the radio signal capturing units 41a and 41b that obtains the largest RSSI.

Accordingly, by comparing only the values of the RSSIs of the radio signal capturing units 41a and 41b with one another, the presence area of the radio signal capturing unit obtaining the largest RSSI is determined as the estimated area where the radio signal transmitting terminal 10 exists. This leads to an effect of reducing a processing amount for area estimation.

Moreover, the area estimation system of the first embodiment includes the time manager units 42a and 42b transmitting the time information on the current time, and the RSSI storage unit 123 stores the RSSI, the radio signal transmitting terminal ID, the radio signal capturing terminal ID and the time information in association with one another.

The time information is obtained by each of the time manager units 42a and 42b, and indicates a time when each of the radio signal capturing units 41a and 41b captures the radio signal.

In this way, the area where the radio signal transmitting terminal 10 exists can be estimated by using the time information.

The presence area estimation unit 140 estimates the presence area of the radio signal transmitting terminal 10 by using a plurality of RSSIs including past records thereof which are obtained by the radio signal capturing units 41a and 41b.

Accordingly, the past records of the RSSIs are also used for identifying the presence area of one of the radio signal capturing units 41a and 41b that obtains the largest RSSI.

This produces an effect that the area can be properly estimated even when the radio signal temporarily fluctuates due to the movements of people and things or the like.

In addition, the presence area estimation unit 140 may estimate the presence area of the radio signal transmitting terminal 10 by using the latest RSSIs obtained by the radio signal capturing units 41a and 41b.

In this case, the area can be always estimated by using the latest RSSIs. This brings about an effect that it is possible to identify the latest area of the radio signal transmitting terminal 10 which is a target for area estimation.

The presence area estimation unit 140 may determine that the presence area of the radio signal transmitting terminal 10 is the same as that of one of the radio signal capturing units 41a and 41b that obtains the largest RSSI at the same time as, or the nearest time to a time when a certain radio signal receiving terminal 30 receives a radio signal.

In this case, the presence area can be estimated with higher accuracy than otherwise by comparing the RSSIs which the radio signal capturing units 41a and 41b obtain at the same time as, or the nearest time.

Furthermore, the area estimation system of the first embodiment, the network connecting the radio signal capturing terminals 40a and 40b to the area estimation apparatus 100 is wired.

In this way, the radio signal capturing units 41a and 41b transmit the obtained RSSIs to the RSSI receiver unit 110 through the wired network. This makes it possible to prevent the band of the wireless network from being crowded.

(Modified Examples)

Hereinafter, descriptions will be given of modified examples of the area estimation apparatus 100 of the first embodiment.

The area estimation system of the foregoing embodiment includes the indoor base station 20. However, an area estimation apparatus 100 can be operated without the indoor base station 20, if a radio signal transmitting terminal 10 and a radio signal receiving terminal 30 are connected to each other in an ad hoc mode.

Figure 7:
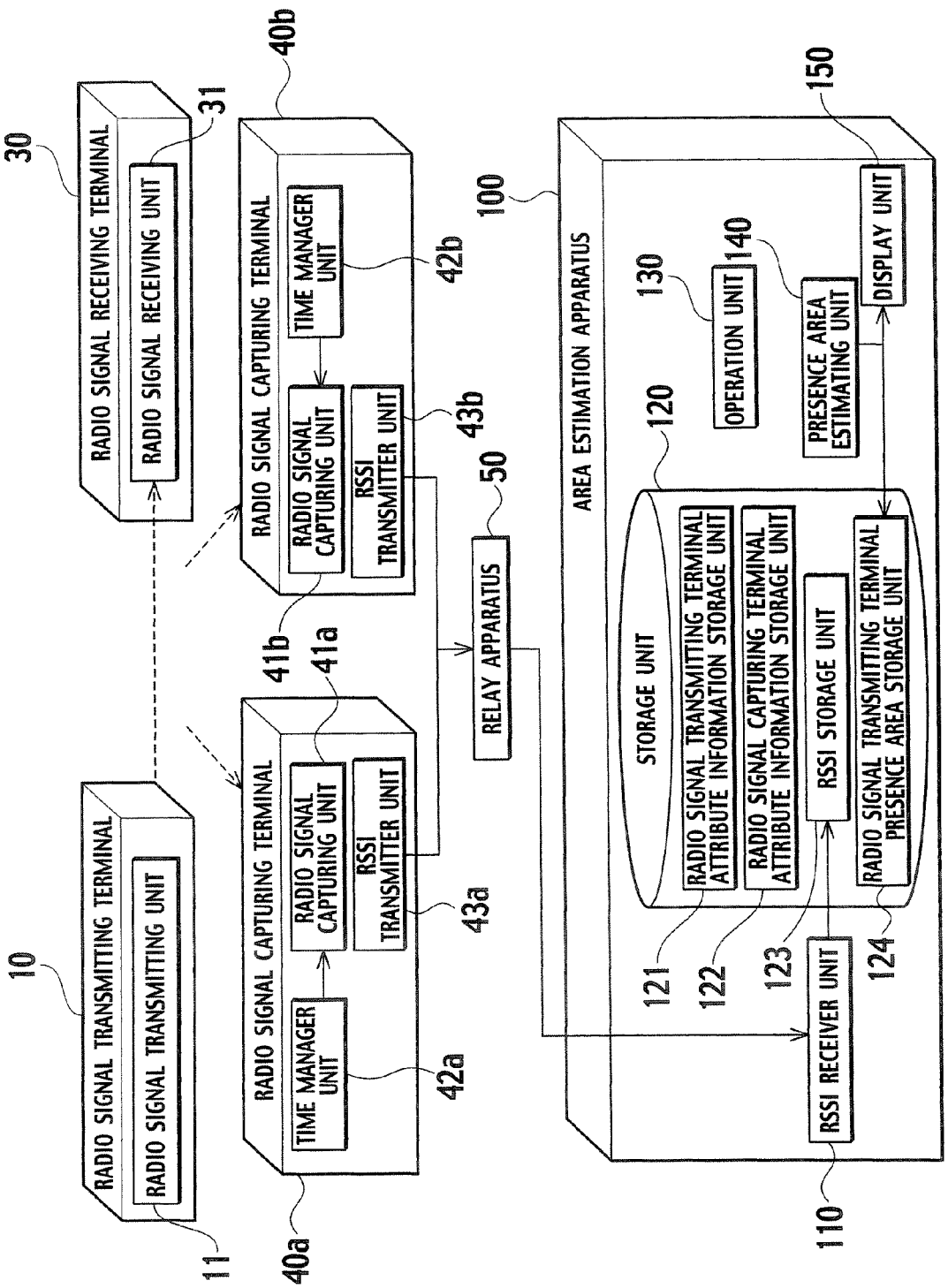
FIG. 7 is a configuration block diagram of a modified example of the area estimation system of the first embodiment.

FIG. 7 shows a configuration diagram of a modified example. This configuration produces an effect that an area estimation system can be constructed by using only terminals without an indoor base station 20.

Moreover, the area estimation system of the foregoing embodiment includes the relay apparatus 50.

Nevertheless, an area estimation apparatus 100 can be operated without a relay apparatus 50 when radio signal capturing terminals 40a and 40b communicate with the area estimation apparatus 100 through a wireless network.

This configuration allows the area estimation system to be utilized even in an environment equipped with no wired network, particularly.

In addition, in the area estimation system of the foregoing embodiment, the radio signal transmitting terminal 10 whose presence area is unknown transmits an ICMP Echo Request packet to the radio signal receiving terminal 30.

Alternatively, it is also possible to estimate the area in the following way.

Firstly, the radio signal receiving terminal 30 or the area estimation apparatus 100 obtains the IP address of the radio signal transmitting terminal 10 from the radio signal transmitting terminal attribute information storage unit 121, and transmits an ICMP Echo Request packet to the radio signal transmitting terminal 10.

Then, the radio signal capturing terminals 40a and 40b capture an ICMP Echo Reply packet which is a replay packet to the ICMP Echo Request packet.

In this way, the RSSIs are obtained, and thus the area estimation can be carried out. For the purpose of achieving this, an administrator previously stores an IP address corresponding to the radio signal transmitting terminal ID in the radio signal transmitting terminal attribute information storage unit 121.

FIG. 8 shows an example of information stored in the radio signal transmitting terminal attribute information storage unit 121.

This configuration makes it possible to estimate the area without making particular improvement and the like in the system, even in a case where a radio signal transmitting terminal 10 whose presence area is unknown is a mobile phone or the like, and where thereby it is difficult for the radio signal transmitting terminal 10 to execute a program for transmitting a radio signal or the like.

When the radio signal transmitting terminal 10 cannot transmit an ICMP Echo Request packet because it is out of a transmittable place or the like, the transmission of the ICMP Echo Request packet is suspended at a time when the ICMP Echo Request packet cannot be transmitted up to a predetermined number of times.

The radio signal transmitting terminal 10 in which the transmission is suspended may be caused to again transmit an ICMP Echo Request packet either after a predetermined period of time, or in response to an explicit request from an administrator.

Moreover, in a case where the area estimation apparatus 100 transmits an ICMP Echo Request packet to all the radio signal transmitting terminals, it is possible to use a broadcast packet This results in a reduction of the wireless network traffic.

In the area estimation system of the foregoing embodiment, an ICMP Echo Request packet is transmitted to the radio signal receiving terminal 30 from the radio signal transmitting terminal 10 whose presence area is unknown.

Instead, any type of radio signals can be used for the area estimation, as long as the radio signals are transmitted from the radio signal transmitting terminal 10 whose presence area is unknown.

For example, it is possible to estimate an area by using a management packet such as ProbeRequest, which the radio signal transmitting terminal 10 usually periodically transmits; a control packet such as PS-Poll; a data packet which the radio signal transmitting terminal 10 transmits in data communications; and the like. In this way, the communications traffic needed for the area estimation can be reduced.

Moreover, in the area estimation system of the foregoing embodiment, the RSSI transmitter units 43a and 43b of the radio signal capturing terminals 40a and 40b transmit a column of RSSIs obtained for a certain time period.

Alternatively, each of the RSSI transmitter units 43a and 43b can calculate the average value, the median value and the largest value of RSSIs in a column obtained for the certain time period, and then can transmit the result of the calculation in association with: the MAC address uniquely identifying the radio signal transmitting terminal 10; the MAC address uniquely identifying the radio signal capturing terminal 40a or 40b, that is, its own MAC address; the RSSI obtaining time which is obtained from the time manager 42a or 42b.

This results in a reduction of the communications traffic needed for the RSSI transmission.

In the area estimation system of the foregoing embodiment, the RSSI transmitter units 43a and 43b of the radio signal capturing terminals 40a and 40b transmit the RSSIs and the related information, which are obtained by the radio signal capturing units 41a and 41b, from the RSSI transmitter units 43a and 43b, out of synchronization with the area estimation apparatus 100.

Instead, the RSSI receiver unit 110 may control a timing of transmitting the RSSIs. To be more precise, an administrator newly registers an IP address of each of the radio signal capturing terminal IDs in the radio signal capturing terminal attribute information storage unit 122.

FIG. 9 shows an example of information stored in the radio signal capturing terminal attribute information storage unit 122.

After that, the RSSI receiver unit 110 sends a transmission request to the RSSI transmitter units 43a and 43b of a radio signal capturing terminal 40a and 40b registered in the radio signal capturing terminal attribute information storage unit 122.

Then, the RSSI transmitter units 43a and 43b having received the transmission request transmits the obtained RSSIs and the obtained related information to the RSSI receiver unit 110.

It is possible to employ a method for controlling the transmission either in which the RSSI receiver unit 110 is allowed to send a transmission request, at one time, to only one RSSI transmitter unit of a radio signal capturing terminal among all the radio signal capturing terminals, or in which the RSSI receiver unit 110 is allowed to send a transmission request, at one time, to only one RSSI transmitter unit of a radio signal capturing terminal in a group of radio signal capturing terminals connected to a relay apparatus 50 or an indoor base station 20.

In addition, there is a possibility that some of the radio signal capturing terminals registered in the radio signal capturing terminal attribute information storage unit 122 are out of operation.

For this reason, in a case where the RSSI receiver unit 110 does not receive any reply to the transmission requests, which are sent a predetermined number of times, from a certain radio signal capturing terminal, the radio signal capturing terminal is excluded from a target for sending the transmission request.

Then, either after a predetermined period of time, or in response to an explicit request from the administrator, the RSSI receiver unit 110 again sends a transmission request to the radio signal capturing terminal which has been excluded from the target for the transmission request.

With this configuration, it is possible to avoid a collision and retransmission of packets transmitted from the RSSI transmitter units 43a and 43b to the RSSI receiver unit 110, and thereby to avoid an increase in the network traffic which would otherwise occur due to the retransmission of the packets, in particular, in a case where the radio signal capturing terminals 40a and 40b communicate with the area estimation apparatus 100 through a wireless network.

Furthermore, in the area estimation system of the foregoing embodiment, although it is assumed that each of the radio signal capturing terminals 40a and 40b includes only one of the radio signal capturing unit, they may include a plurality of radio signal capturing units.

When each of the radio signal capturing units is formed of an USB-type wireless LAN adaptor, a plurality of radio signal capturing units can be physically mounted in each of the radio signal capturing terminals 40a and 40b.

By using a USB hub or a USB extension cable, each of the radio signal capturing units 40a and 40b can be allocated corresponding to a plurality of areas which are far from one another in distance.

This configuration makes it possible to reduce the number of radio signal capturing terminals 40a and 40b and thus hardware costs.

In a case where a radio signal capturing terminal includes a plurality of radio signal capturing units, an RSSI transmitter unit has to send the RSSIs of the radio signal transmitting terminal which are obtained by all the radio signal capturing units. Instead, the following way may be adopted.

Specifically, firstly, with respect to the radio signal transmitting terminal 10, a comparison is made among the received levels of the RSSIs obtained by all the radio signal capturing units connected to one radio signal capturing terminal.

Then, the RSSI of only one of the radio signal capturing units that obtains the largest RSSI is transmitted in association with the radio signal transmitting terminal ID and the radio signal capturing terminal ID.

This configuration leads to a reduction in a data amount transmitted to the area estimation apparatus 100, and thus a reduction in a traffic amount.

Second Embodiment

In the first embodiment, in a case where any of radio signal capturing terminals 40a and 40b obtains a plurality of RSSIs, the presence area estimation unit 140 calculates the average value, the median value and the largest value, and uses them as the RSSI of the radio signal capturing terminal.

In a second embodiment, a presence area estimation unit 140 further includes an RSSI time variation comparison unit 141, and thereby identifies the nearest radio signal capturing terminal on the basis of the time variations of the RSSIs obtained by the radio signal capturing terminals 40a and 40b.

(Area Estimation System)

Figure 10:
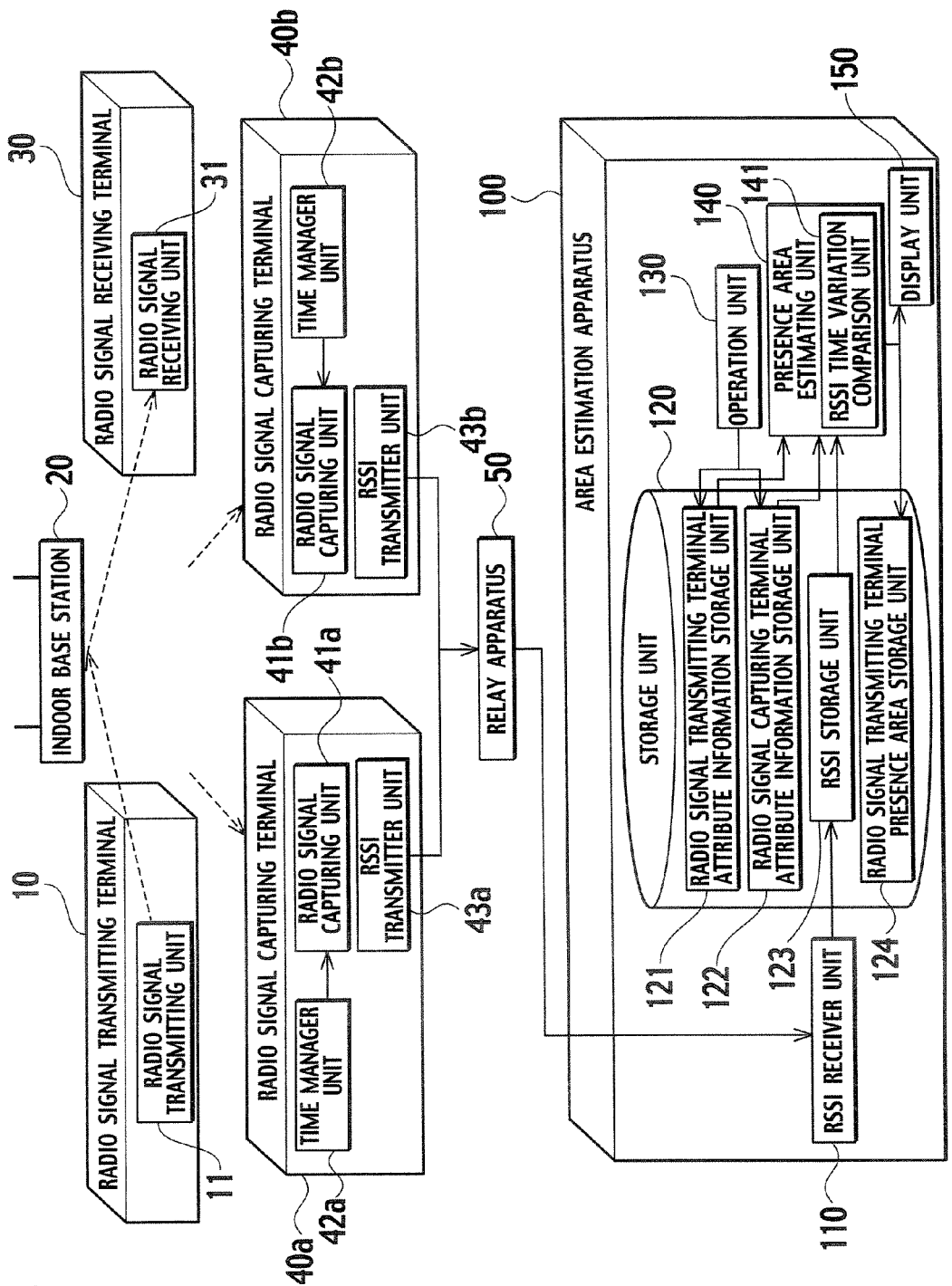
FIG. 10 is a configuration block diagram of an area estimation system of a second embodiment.

As shown in FIG. 10, an area estimation system of the second embodiment includes a radio signal transmitting terminal 10, an indoor base station 20, a radio signal receiving terminal 30, radio signal capturing terminals 40a and 40b, a relay apparatus 50 and an area estimation apparatus 100.

The radio signal transmitting terminal 10, the indoor base station 20, the radio signal receiving terminal 30, the radio signal capturing terminals 40a and 40b and the relay apparatus 50 are the same as those in the first embodiment, and thus the explanation thereof is omitted here.

The area estimation apparatus 100 includes an RSSI receiver unit 110, a storage unit 120, an operation unit 130, the presence area estimation unit 140 and a display unit 150.

The RSSI receiver unit 110, the storage unit 120, the operation unit 130 and the display unit 150 are also the same as those in the first embodiment, and thus the explanation thereof is omitted here as well.

The presence area estimation unit 140 includes the RSSI time variation comparison unit 141.

The RSSI time variation comparison unit 141 is configured to calculate the time variation in a column of RSSIs of each radio signal transmitting terminal 10 which are obtained by each of the radio signal capturing terminals 40a and 40b.

The following formula is for calculating the time variation in a column of RSSIs $(X_{Y1}, \ldots, X_{Yn})$ of a radio signal transmitting terminal X which are obtained by a radio signal capturing terminal Y in the last N seconds before the current time.

$$\text{Time variation}\left(\begin{array}{l}\text{radio signal transmitting terminal } X, \\ \text{radio signal capturing terminal } Y\end{array}\right) = \frac{1}{n-1}\sum_{i=1}^{n}(X_{Yi} - \overline{X}_Y)^2 \Lambda, \quad (1)$$

where $\overline{X}_Y$ denotes the average value of $(X_{Y1}, \ldots, X_{Yn})$

The presence area estimation unit 140 is configured to compare the time variations of the respective radio signal capturing terminals 40a and 40b with each other, and to determine the radio signal capturing terminal of the largest time variation as the nearest radio signal capturing terminal.

(Area Estimation Method)

Hereinafter, descriptions will be given of an area estimation method of the second embodiment by using FIG. 2. Steps S101 to S104 are the same as those in the first embodiment, and thus the explanation thereof is omitted here.

After step S104, the area estimation apparatus 100 estimates the presence area of the radio signal transmitting terminal 10 by using the obtained RSSIs (S105).

To be more precise, the area estimation apparatus 100 obtains, from an RSSI storage unit 123, the RSSIs which each of the radio signal capturing terminals 40a and 40b obtains in the last N seconds before the current time.

This obtaining process is carried out either periodically, or in response to a trigger event in which the information on a new RSSI is stored in the RSSI storage unit 123.

Thereafter, the area estimation apparatus 100 calculates the time variation in a column of the RSSIs of each radio signal transmitting terminal 10 which are obtained by each of the radio signal capturing terminals 40a and 40b.

Then, a comparison is made between the time variations of the respective radio signal capturing terminals 40a and 40b, and the radio signal capturing terminal having the largest time variation is determined as the nearest radio captureion terminal.

(Effects)

In the area estimation system of the second embodiment, the radio signal capturing terminal that obtains RSSIs varying the most widely during a certain period of time is identified by using the amounts of variations of the past records of RSSIs.

Thus, in contrast to the other cases, the area estimation system can utilize the variations of RSSIs caused by a situation where a radio signal transmitting terminal 10 exists at the nearest place to the radio signal capturing terminal.

Accordingly, even when a radio signal fluctuates due to the movement of a person toting a radio signal transmitting terminal 10, it is possible to estimate the area. Moreover, the area estimation can be performed with high accuracy.

Third Embodiment

In the first embodiment, in a case where a certain one of radio signal capturing terminals 40a and 40b obtains a plurality of RSSIs, the presence area estimation unit 140 calculates the average value, the median value, the largest value, the variance and the like of the RSSIs, and uses these values as the RSSI of the radio signal capturing terminal.

Then, the presence area estimation unit 140 identifies the nearest radio signal capturing terminal by making a comparison between the RSSIs of the respective radio signal capturing terminals 40a and 40b.

In a third embodiment, a presence area estimation unit 140 further includes a confidence factor determination unit 142.

By using confidence factors, the presence area estimation unit 140 is configured to output only an estimated area satisfying the reliability required by a user.

Here, the confidence factor specifies the degree of difference in a feature quantity including the average value, the median value, the largest value and the variance of RSSIs obtained by each of the radio signal capturing terminals 40a and 40b.

(Area Estimation System)

Figure 11:
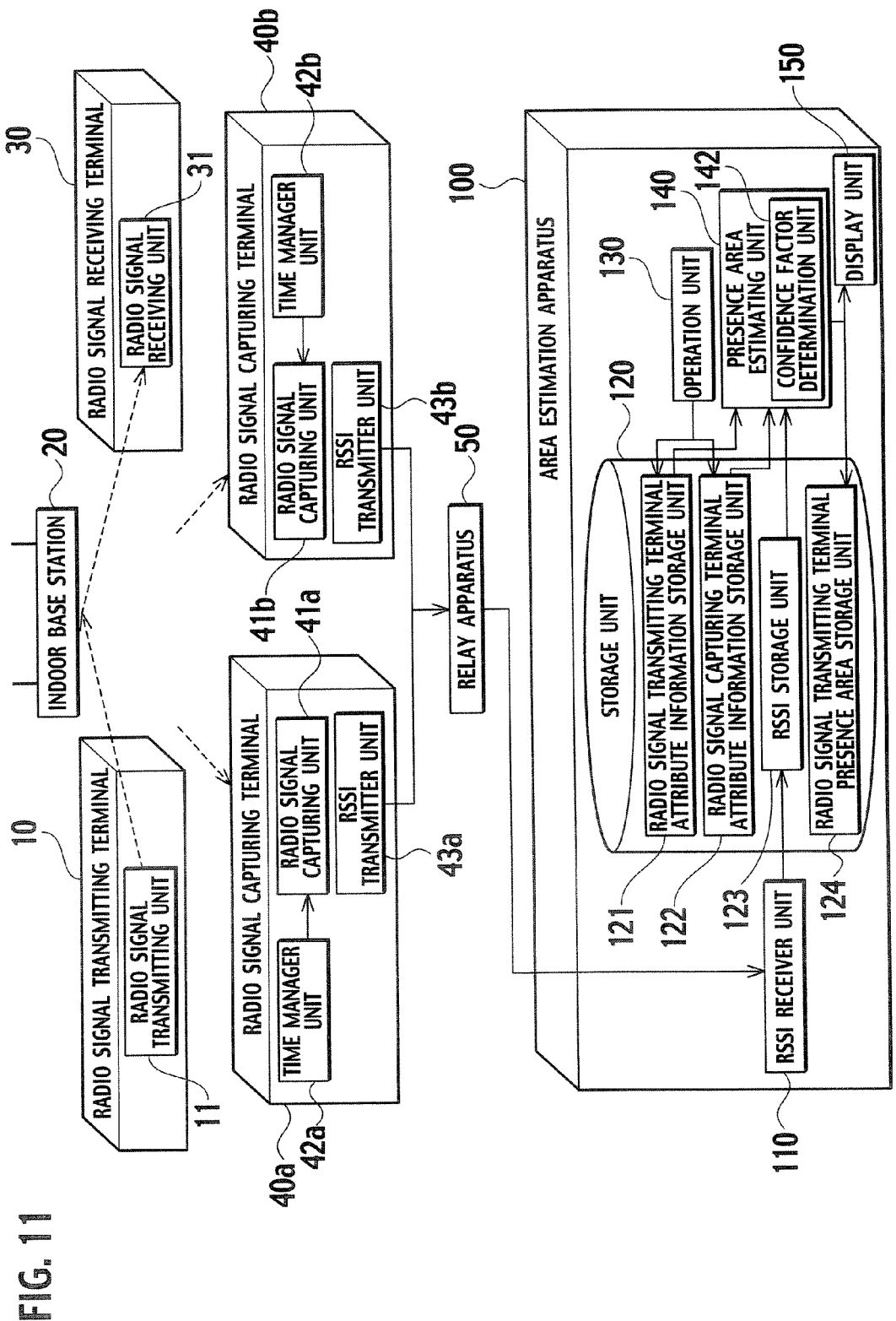
FIG. 11 is a configuration block diagram of an area estimation system of a third embodiment.

As shown in FIG. 11, an area estimation system of the third embodiment includes a radio signal transmitting terminal 10, an indoor base station 20, a radio signal receiving terminal 30, radio signal capturing terminals 40a and 40b, a relay apparatus 50 and an area estimation apparatus 100.

The radio signal transmitting terminal 10, the indoor base station 20, the radio signal receiving terminal 30, the radio signal capturing terminals 40a and 40b and the relay apparatus 50 are the same as those in the first embodiment, and thus the explanation thereof is omitted here.

The area estimation apparatus 100 includes an RSSI receiver unit 110, a storage unit 120, an operation unit 130, the presence area estimation unit 140 and a display unit 150.

The RSSI receiver unit 110, the storage unit 120, the operation unit 130 and the display unit 150 are also the same as those in the first embodiment, and thus the explanation thereof is omitted here as well.

The presence area estimation unit 140 includes the confidence factor determination unit 142.

The confidence factor determination unit 142 is configured to calculate a feature quantity from a column of RSSIs of each radio signal transmitting terminal 10 which are obtained by each of the radio signal capturing terminals 40a and 40b, and then to calculate a confidence factor specifying the degree of difference between the feature quantities of the respective radio signal capturing terminals 40a and 40b.

Here, the feature quantity includes the average value, the median value, the largest value, the variance and the like.

Any one of the following formulas (2) and (3) is used for calculating a confidence factor with respect to a feature quantity FQ ($MB_k$, $TM_j$, N) of a column of RSSIs of a radio signal transmitting terminal $MB_k$ which are obtained by a radio signal capturing terminal $TM_j$ in the last N seconds before the current time:

$$\text{confidence } factor_a(MB_k, TM_j, N) = \frac{Const * \{FQ(MB_k, TM_j, N) - \overline{FQ(MB_k)}\}}{\sqrt{\frac{1}{m-1}\sum_{i=1}^{m}\{FQ(MB_k, TM_j, N) - \overline{FQ(MB_k)}\}^2}} \Lambda$$

(2), and $$\text{confidence } factor_b (MB_k, TM_j, N) = Const * \{FQ(MB_k, TM_j, N) - \overline{FQ(MB_k)}\}\Lambda \quad (3),$$

where $\overline{FQ(MB_k)}$ denotes either the average value of feature quantities [FQ ($MB_k$, $TM_1$, N), . . . , FQ ($MB_k$, $TM_m$, N)] of the radio signal transmitting terminal $MB_k$ which are obtained by a group of radio signal capturing terminals [$TM_1$, . . . , $TM_m$], or the average value of feature quantities [FQ ($MB_k$, $TM_1$, N), . . . , FQ ($MB_k$, $TM_{j-1}$, N), FQ ($MB_k$, $TM_{j+1}$, N), . . . , FQ ($MB_k$, $TM_m$, N)] of the radio signal transmitting terminal $MB_k$ which are obtained by a group of radio signal capturing terminals [$TM_1$, . . . , $TM_{j-1}$, $TM_{j+1}$, . . . , $TM_m$] excluding the radio signal capturing terminal $TM_j$. Moreover, Const denotes a constant number.

The confidence factor can be more effectively calculated when radio signal capturing terminals used for calculating the confidence factor are limited only to the radio signal capturing terminals near the radio signal transmitting terminal.

For example, it is possible to employ a limiting method in which only M radio signal capturing terminals obtaining the M largest RSSIs of the radio signal transmitting terminal are used for calculating the confidence factor.

Subsequently, the presence area estimation unit 140 is configured to calculate the confidence factor of each of the radio signal capturing terminals 40a and 40b, and to compare the confidence factor with a threshold value.

In a case where there is at least one radio signal capturing terminal having the confidence factor larger than the threshold value, the radio signal capturing terminal ID and the confidence factor thereof are stored in an radio signal transmitting terminal presence area storage unit 124.

FIG. 12 shows an example of information in a case where, with respect to a radio signal transmitting terminal of the radio signal transmitting terminal ID of 00:11:22:33:44:A1, there are two radio signal capturing terminals each having the confidence factor larger than the threshold value, the radio signal capturing terminal IDs of which are 00:11:22:33:44:02 and 00:11:22:33:44:03.

In this case, the display unit 150 shows "Mr. Suzuki— Suzuki's seat, near Yoshida's seat".

On the other hand, in a case where there is no radio signal capturing terminal having the confidence factor larger than the threshold value, the threshold value may be lowered.

Alternatively, one or more of the following methods may be employed until a radio signal capturing terminal having the confidence factor larger than the threshold value becomes available:

1) store the radio signal capturing terminal ID and the confidence factor of the radio signal capturing terminal having the largest confidence factor in the radio signal transmitting terminal presence area storage unit 124;

2) wait for α seconds more, and recalculate the confidence factor from a column of the RSSIs obtained in the last N+α seconds before the current time;

3) wait for N seconds more, and recalculate the confidence factor from a column of the RSSIs obtained in the last N seconds before the current time; and 4) wait for N seconds more, recalculate the confidence factor from a column of the RSSIs obtained in the last N seconds before the current time, and sum up the currently calculated confidence factor and the previous confidence factor.

(Area Estimation Method)

Hereinafter, descriptions will be given of an area estimation method of the third embodiment by using FIG. 2.

Steps S101 to S104 are the same as those in the first embodiment, and thus the explanation thereof is omitted here.

After step S104, the area estimation apparatus 100 estimates the presence area of the radio signal transmitting terminal 10 by using the obtained RSSIs (S105).

Specifically, the area estimation apparatus 100 obtains, from the RSSI storage unit 123, the RSSIs which each of the radio signal capturing terminals 40a and 40b obtains in the last N seconds before the current time, and this obtaining process is carried out either periodically, or in response to a trigger event in which the information on a new RSSI is stored in the RSSI storage unit 123.

Thereafter, the area estimation apparatus 100 calculates the feature quantity from a column of the RSSIs of each radio signal transmitting terminal 10 which are obtained by each of the radio signal capturing terminals 40a and 40b, and then calculates the confidence factor specifying the degree of difference between the feature quantities.

Thus, the area estimation apparatus 100 calculates the confidence factor of each of the radio signal capturing terminals 40a and 40b, and compares the confidence factor with the threshold value.

In a case where there is at least one radio signal capturing terminal having the confidence factor larger than the threshold value, the radio signal capturing terminal ID and the confidence factor thereof are stored in the radio signal transmitting terminal presence area storage unit 124.

(Effects)

According to the area estimation system and the area estimation method of the third embodiment, it is possible to output only estimation results satisfying the reliability required by a user.

In addition, in a case where an area estimation is executed in response to a request from a user, the user may be forced to wait for several seconds after making the request for the area estimation until each of the radio signal capturing terminals obtains a plurality of RSSIs.

Even in this case, however, since the confidence factor determining unit 142 can identify the minimum number of past data records satisfying the reliability (the confidence factor) required by the user, the area estimation can be executed in real time as much as possible.

Moreover, in a case where there are a plurality of radio signal capturing terminals satisfying the reliability (the confidence factor) required by the user, the areas corresponding to these radio signal capturing terminals are outputted.

This output allows the user to appropriately estimate the area even when the radio signal transmitting terminal 10 is located at a place extending across a plurality of areas, or a place intermediate between the areas.

Moreover, the presence area estimation unit 140 can make use of the methods described in the first to third embodiments by combining them.

Precisely, the first one of the methods is for identifying the radio signal capturing terminal of the largest RSSI, the second method is for identifying the radio signal capturing terminal of the largest time variation, and the third method is for identifying the radio signal capturing terminal having the confidence factor larger than the threshold value.

Use of the methods thus combined leads to an accomplishment of an area estimation with further higher accuracy than otherwise.

Fourth Embodiment

In the first embodiment, the presence area estimation unit 140 executes the area estimation every one second, and this time interval is static. Moreover, the number of past records used for the area estimation is also constant.

In a fourth embodiment, by adding an area estimation frequency determination unit 160, an area estimation frequency is determined on the basis of the presence area of a radio signal transmitting terminal 10 and/or the attribute information of the radio signal transmitting terminal 10.

Moreover, by adding a staying-moving judgment unit 180, a judgment is made on whether a user toting a radio signal transmitting terminal 10 is staying in an area or is moving from area to area.

The area estimation frequency determination unit 160 is configured to determine the area estimation frequency on the basis of the result of the judgment.

In addition, by adding a RSSI-record-use unit 190 configured to determine the number of past records of RSSIs to be used), the number of RSSI past records to be used is determined according to whether a user is staying in an area or is moving from area to area.

(Area Estimation System)

Figure 13:
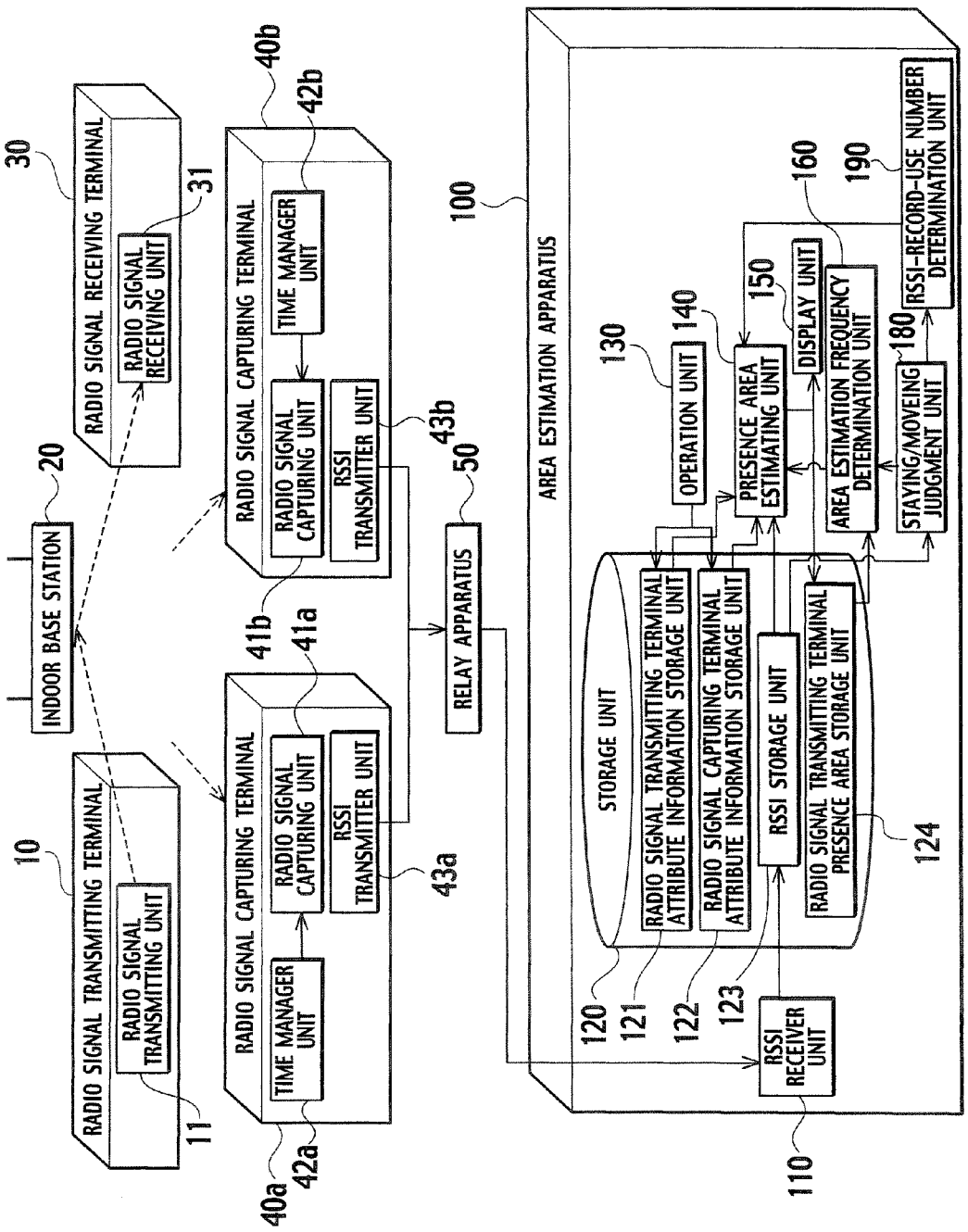
FIG. 13 is a configuration block diagram of an area estimation system of a fourth embodiment.

As shown in FIG. 13, an area estimation system of the fourth embodiment includes a radio signal transmitting terminal 10, an indoor base station 20, a radio signal receiving terminal 30, radio signal capturing terminals 40a and 40b, a relay apparatus 50 and an area estimation apparatus 100.

The radio signal transmitting terminal 10, the indoor base station 20, the radio signal receiving terminal 30, the radio signal capturing terminals 40a and 40b and the relay apparatus 50 are the same as those in the first embodiment, and thus the explanation thereof is omitted here.

The area estimation apparatus 100 includes an RSSI receiver unit 110, a storage unit 120, an operation unit 130, the presence area estimation unit 140, a display unit 150, an area estimation frequency determination unit 160, a staying-moving judgment unit 180 and the RSSI-record-use number determination unit 190.

The RSSI receiver unit 110, the storage unit 120, the operation unit 130 and the display unit 150 are also the same as those in the first embodiment, and thus the explanation thereof is omitted here as well.

The staying-moving judgment unit 180 is configured to judge whether a radio signal transmitting terminal 10 is moving from area to area or staying in an area.

To be more precise, the staying-moving judgment unit 180 is configured to refer to an radio signal transmitting terminal presence area storage unit 124 and an radio signal capturing terminal attribute information storage unit 122, after the presence area estimation unit 140 executes an area estimation.

If the presence areas of the radio signal transmitting terminal 10 estimated in the last Ts seconds before the current time are identical, the staying-moving judgment unit 180 judges that the radio signal transmitting terminal 10 is "staying in the area".

Here, Ts is set so that the radio signal transmitting terminal presence area storage unit 124 can contain one or more estimation results.

Meanwhile, if the presence areas are not identical, the staying-moving judgment unit 180 judges that the radio signal transmitting terminal 10 is "moving from area to area".

Alternatively, by using the time variation of either the RSSIs or the confidence factors of a radio signal transmitting terminal 10 obtained by radio signal capturing terminals existing near the radio signal transmitting terminal 10, the staying-moving judgment unit 180 judges whether the radio signal transmitting terminal 10 is staying in an area, or moving from area to area.

Specifically, the staying-moving judgment unit 180 judges that the radio signal transmitting terminal is staying in the area, if, in the last Tsd seconds before the current time, at least one terminal of a group of radio signal capturing terminals existing near the radio signal transmitting terminal 10 obtains the RSSIs or the confidence factor of the radio signal transmitting terminal, the time variation of which is larger than a threshold value THsd.

On the other hand, the staying-moving judgment unit 180 judges that the radio signal transmitting terminal is moving from area to area, if it does not judge that the radio signal transmitting terminal is staying in the area, and if there are at least one or two terminals of the group of the near radio signal transmitting terminals each obtaining the RSSIs or the confidence factors of the radio signal transmitting terminal, the time variation of which is smaller than a threshold value THsd.

The area estimation frequency determination unit 160 is configured to determine the area estimation frequency according to the result of the judgment made by the staying-moving judgment unit 180, as follows:
1) in moving from area to area: a basic area estimation interval; and
2) in staying in an area: min (a constant number times the basic area estimation interval, the longest allowable area estimation interval), or min (n times the basic area frequency interval, the longest allowable area estimation interval).

Here, the basic area estimation interval has to be set in advance, and n denotes the number of times that the staying-moving judgment unit 180 judges that a terminal is "staying in an area" after judgments are made on whether the terminal is staying in an area or moving from area to area.

Note that an ICMP Echo Request signal/an ICMP Echo Reply signal are transmitted Np times at intervals of Tdp seconds at every area estimation frequency determined as described above.

Tdp is set in advance in consideration of the real-timeliness and the load on the system.

Np is set in advance in consideration of the number of data records of RSSIs needed to allow the area estimation to be appropriately executed even in an environment where a noise occurs.

The optimal Tdp and Np can be obtained through experiments, and it is appropriate that Tdp is set at 0.5 to 1 second, and that Np is set at 1 to 10. In addition, Tdp and Np may be set at different values for a time in staying and for a time in moving, respectively.

Moreover, a time range N specifying the number of past records of RSSIs to be used for executing one area estimation is determined as follows.

Specifically, the number of seconds which allows all the RSSIs of ICMP Echo request signals transmitted during one area estimation period to be used is compared with the number of seconds obtained by subtracting an area changing time from the current time (the current time−the area changing time), and it is effective that the smaller number of seconds therebetween is employed for the time range N.

As for the former number of seconds, it is desirable that an inequality N>Tdp×Np+α be satisfied, in short. Here, α denotes a delay time of an ICMP Echo Request signal.

As for the latter number of seconds, the area changing time denotes the latest time when the nearest radio signal capturing terminal has been changed to the newest one in the radio signal transmitting terminal presence area storage unit 124.

The RSSI-record-use number determination unit 190 is configured to determine the number of past records of RSSIs to be used according to whether a user is staying in an area or moving from area to area.

The presence area estimation unit 140 is configured to estimate the presence area at the frequency determined by the area estimation frequency determination unit 160.

The other functions of the presence area estimation unit 140 are the same as those in the first embodiment, and thus the explanation thereof is omitted here.

(Area Estimation Method)

Figure 14:
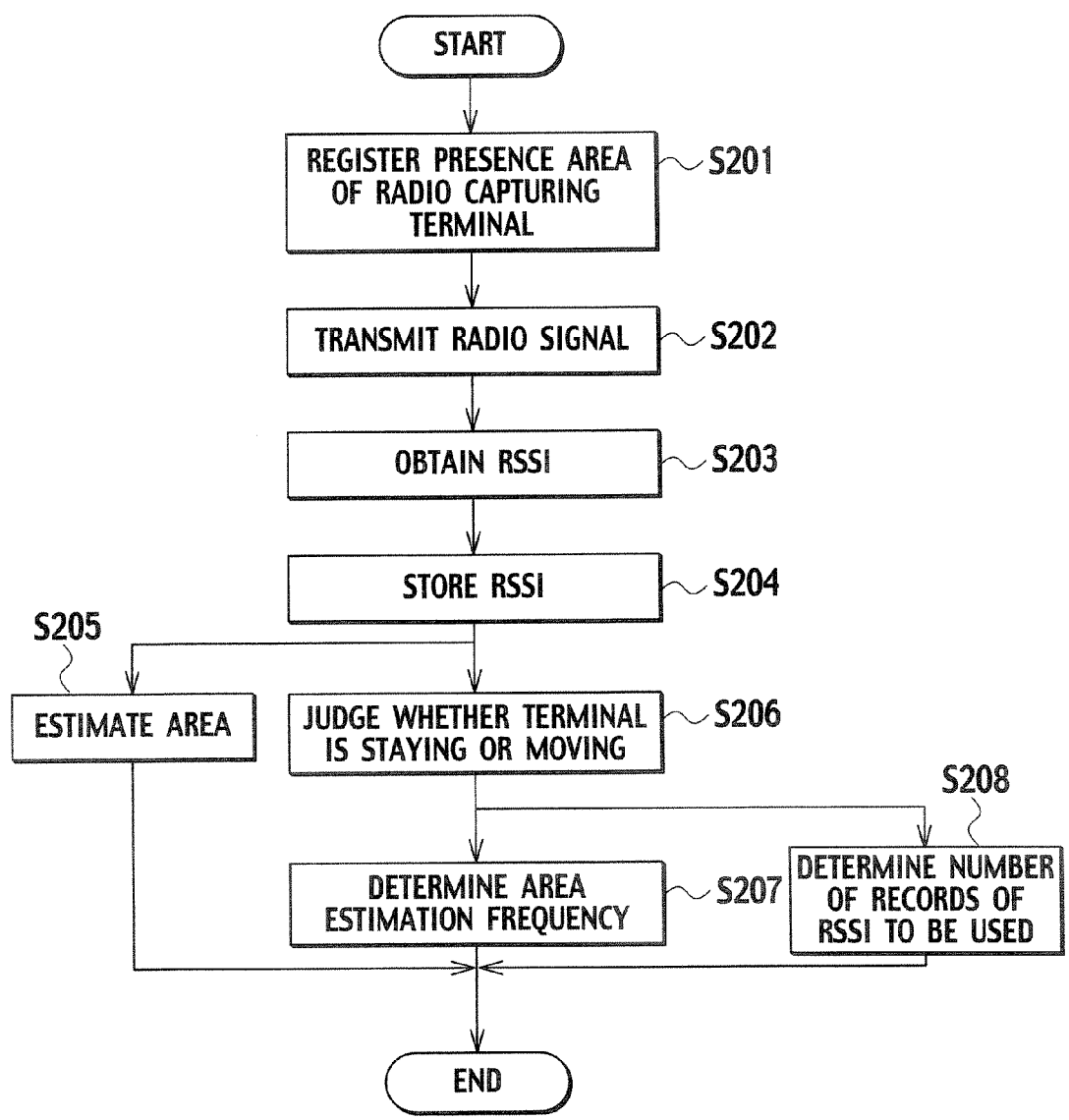
FIG. 14 is a flowchart showing an area estimation method of the fourth embodiment.

Hereinafter, an area estimation method of the fourth embodiment will be described by using FIG. 14.

Step S201 is the same as step S101 of FIG. 2, and thus the explanation thereof is omitted here.

After step S201, the radio signal transmitting terminal 10 transmits a radio signal (S202).

Precisely, the radio signal transmitting terminal 10 transmits an ICMP Echo Request packet to the radio signal receiving terminal 30.

Here, the area estimation apparatus 100 or the radio signal capturing terminals 40a and 40b may additionally serve as the radio signal receiving terminal 30.

Each of intervals at which an ICMP Echo Request packet is transmitted is equivalent to the estimation frequency determined by the area estimation frequency determination unit 160.

Instead, ICMP Echo Request packets may be transmitted Ndp times at short-cycle intervals of T2 seconds at every estimation frequency which is determined by the area estimation frequency determination unit 160.

Steps S203 to S205 are the same as steps S103 to S105 of FIG. 2, and thus the explanation thereof is omitted here.

After step S205, the area estimation apparatus 100 judges whether the radio signal transmitting terminal 10 is moving from area to area or is staying in an area (S206).

Precisely, the staying-moving judgment unit 180 refers to an radio signal transmitting terminal presence area storage unit 124 and an radio signal capturing terminal attribute information storage unit 122, after the presence area estimation unit 140 executes an area estimation.

If the presence areas of the radio signal transmitting terminal 10 estimated in the last Ts seconds before the current time are identical, the staying-moving judgment unit 180 judges that the radio signal transmitting terminal 10 is "staying in the area".

Here, Ts is set so that the radio signal transmitting terminal presence area storage unit 124 can contain one or more estimation results.

Meanwhile, if the presence areas are not identical, the staying-moving judgment unit 180 judges that the radio signal transmitting terminal 10 is "moving from area to area".

Thereafter, both of the frequency of transmitting an ICMP Echo Request signal/an ICMP Echo Replay signal, and the area estimation frequency are determined for each of cases where the terminal is staying in the area and where the terminal is moving from area to area.

Next, the area estimation apparatus 100 determines the area estimation frequency according to whether the radio signal transmitting terminal 10 is moving from area to area or staying in an area (S207).

Specifically, if the above-mentioned staying-moving judgment unit 180 judges that the radio signal transmitting terminal 10 is moving from area to area, the area estimation frequency determination unit 160 sets the area estimation frequency and the ICMP Echo Request signal transmission frequency for a time in moving.

On the other hand, if the above-mentioned staying-moving judgment unit 180 judges that the radio signal transmitting terminal 10 is staying in an area, the area estimation frequency determination unit 160 sets the area estimation frequency and the ICMP Echo Request signal transmission frequency for a time in staying.

Here, in general, these frequencies are preferably set so that the following two inequalities can be satisfied:

Area estimation frequency for a time in moving>Area estimation frequency for a time in staying; and ICMP Echo Request signal transmission frequency for a time in moving>ICMP Echo Request signal transmission frequency for a time in staying.

At the same time, the area estimation apparatus 100 determines the number of past records of RSSIs to be used according to whether the radio signal transmitting terminal 10 is staying in an area or moving from area to area (S208).

To be more precise, if the above-mentioned staying-moving judgment unit 180 judges that the radio signal transmitting terminal 10 is moving from area to area, the RSSI-record-use number determination unit 190 sets the number of past records for a time in moving.

On the other hand, if it is judged that the radio signal transmitting terminal is staying in an area, the RSSI-record-use number determination unit 190 sets the number of past records for a time in staying.

Here, in general, these numbers are preferably set so that the inequality, the number of past records for a time in moving<the number of past records for a time in staying can be satisfied.

(Effects)

According to the area estimation system and the area estimation method of the fourth embodiment, it is possible to dynamically change the area estimation frequency according to whether the radio signal transmitting terminal 10 is staying in an area or moving from area to area.

As a result, the estimation frequency can be reduced mainly while the radio signal transmitting terminal 10 is staying in an area, and thereby the network traffic and the load on the system can be reduced.

With this area estimation system, it is possible to appropriately determine the number of past records of RSSIs to be used according to whether the radio transmitting terminal 10 is staying in an area or moving from area to area.

To be more precise, when the radio transmitting terminal 10 is staying in an area, the number of past RSSI records to be used is set large.

This prevents an estimation error from occurring, although the estimation error may otherwise be caused by the temporal fluctuation of RSSI. Thus, the confidence factor can be enhanced.

On the other hand, when the radio transmitting terminal 10 is moving from area to area, the number of past RSSI records to be used is set small.

Thereby, the presence area can be appropriately estimated, even though the presence area is changed from one to another every moment.

Moreover, it is possible to determine the appropriate area estimation frequency according to whether the radio transmitting terminal 10 is staying in an area or moving from area to area.

Specifically, when the radio transmitting terminal 10 is staying in an area, the area estimation frequency is set high, and this results in a reduction in the network traffic, in the load on the system and in the power consumption.

On the other hand, when the radio transmitting terminal 10 is moving from area to area, the area estimation frequency is set low, and thereby the presence area can be estimated in real time.

(Modified Example)

Furthermore, in the fourth embodiment, the area estimation frequency determination unit 160 dynamically changes the area estimation frequency according to a result of the judgment on whether a user is staying in an area or moving from area to area.

In addition to this, the area estimation frequency determination unit 160 may determine the area estimation frequency according to the confidence factor of each radio signal capturing terminal calculated by a confidence factor determination unit 142 described in the third embodiment.

Firstly, when confidence factors of a radio signal capturing terminal calculated by the confidence factor determination unit 142 are larger than a threshold value, the area estimation frequency determination unit 160 calculates a decline value between the confidence factors of the radio signal capturing terminal.

Specifically, the area estimation frequency determination unit 160 obtains the nearest radio signal capturing terminal and the confidence factor of each radio signal transmitting terminal 10 by referring to the radio signal transmitting terminal presence area storage unit 124.

Then, the area estimation frequency determination unit 160 also obtains the nearest radio signal capturing terminal and the confidence factor thereof at the next area estimation time.

If the nearest radio signal capturing terminals are identical, the area estimation frequency determination unit 160 calculates the decline value of the confidence factors by using the following formula.

Decline value of confidence factor=Previous confidence factor−Current confidence factor Then, the area estimation frequency determination unit 160 resets the area estimation frequency according to the decline value of the confidence factors.

Specifically, the following two methods are possible.

1) If the decline value of confidence factors is equal to a threshold value or more: a basic area estimation interval If the decline value of confidence factors is equal to a threshold value or less: min (a constant number times the basic area estimation interval, the longest allowable area estimation interval), or min (n times the basic area estimation interval, the longest allowable area estimation interval)

2) If the decline value of confidence factors>0: the current area estimation interval/(the decline value of confidence factors×Const).

If the decline value of confidence factors<0: the current area estimation interval×|the decline value of confidence factors|×Const.

Here, the basic area estimation interval has to be set in advance, and n denotes the number of times that the staying-moving judgment unit 180 judges that the terminal is "staying in an area" after judgments are made on whether the terminal is staying in an area or moving from area to area.

The decline value of confidence factors denotes the absolute value of the decline value of confidence factors, and Const denotes a constant number.

This configuration makes it possible to reduce the area estimation frequency in a case where a radio signal transmitting terminal 10 exists near the nearest radio signal capturing terminal, and thereby to reduce the network traffic and the load on the system.

In addition, in this method, using the decline value of confidence factors allows the area estimation frequency determination unit 160 to increase the area estimation frequency by predicting in advance that the radio signal transmitting terminal 10 will move to another area.

Thus, it is possible to estimate the area in real time even while the radio signal transmitting terminal 10 is moving from area to area.

Fifth Embodiment

In the fourth embodiment, attributes of a user and an area are not taken into consideration in the operation of the area estimation frequency determination unit 160.

In a fifth embodiment, by adding an area estimation frequency storage unit 126, the area is estimated at appropriate frequency depending on the attribute information on a radio signal transmitting terminal and a radio signal capturing terminal, or depending on the information on the presence area of the radio signal transmitting terminal.

(Area Estimation System)

Figure 15:
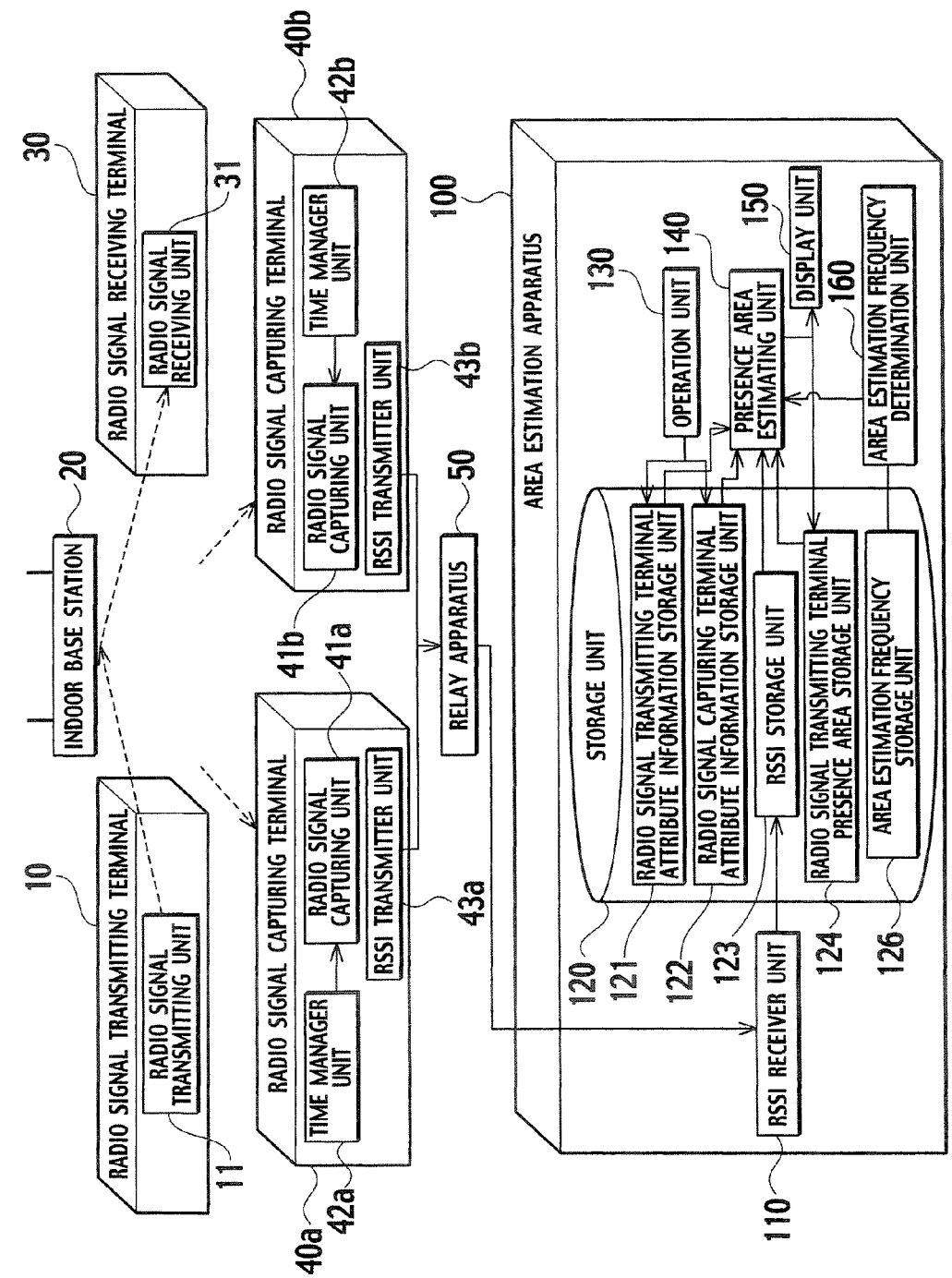
FIG. 15 is a configuration block diagram of an area estimation system of a fifth embodiment.

As shown in FIG. 15, an area estimation system of the fifth embodiment includes a radio signal transmitting terminal 10, an indoor base station 20, a radio signal receiving terminal 30, radio signal capturing terminals 40a and 40b, a relay apparatus 50 and an area estimation apparatus 100.

The radio signal transmitting terminal 10, the indoor base station 20, the radio signal receiving terminal 30, the radio signal capturing terminals 40a and 40b and the relay apparatus 50 are the same as those in the first embodiment, and thus the explanation thereof is omitted here.

The area estimation apparatus 100 includes an RSSI receiver unit 110, a storage unit 120, an operation unit 130, the presence area estimation unit 140, a display unit 150 and an area estimation frequency determination unit 160.

The RSSI receiver unit 110, the operation unit 130 and the display unit 150 are also the same as those in the first embodiment, and thus the explanation thereof is omitted here as well.

The area estimation frequency determination unit 160 is configured to obtain the attribute information on the radio signal transmitting terminal 10, by referring to an radio signal transmitting terminal attribute information storage unit 121.

Moreover, the area estimation frequency determination unit 160 is configured to obtain the presence area of the radio signal transmitting terminal 10, by referring to an radio signal transmitting terminal presence area storage unit 124.

Then, the area estimation frequency determination unit 160 is configured to obtain the attribute information on the radio signal transmitting terminal 10 and/or the area estimation frequency corresponding to the presence area, by referring to the area estimation frequency storage unit 126, and thereby to determine the area estimation frequency.

The storage unit 120 includes the radio signal transmitting terminal attribute information storage unit 121, an radio signal capturing terminal attribute information storage unit 122, an RSSI storage unit 123, the radio signal transmitting terminal presence area storage unit 124 and the area estimation frequency storage unit 126.

The radio signal transmitting terminal attribute information storage unit 121, the radio signal capturing terminal attribute information storage unit 122, the RSSI storage unit 123 and the radio signal transmitting terminal presence area storage unit 124 are the same as those in the first embodiment, and thus the explanation thereof is omitted here.

The area estimation frequency storage unit 126 is configured to store the estimation frequency corresponding to the attribute information on the radio signal transmitting terminal 10 and/or the presence area thereof.

FIGS. 16A and 16B show an example of the information stored in the area estimation frequency storage unit 126.

Here, either specific personal and area names such as "Mr. Yamada" and "Meeting room No. 101", or general personal and area names each indicating a particular category such as "Company staff" or "Meeting room" may be used as a name of a toting user and a presence area name.

In this case, these general names need to be stored in the radio signal transmitting terminal attribute information storage unit 121 and the radio signal capturing terminal attribute information storage unit 122. FIGS. 17 and 18 show examples of the names thus stored, respectively.

(Area Estimation Method)

Hereinafter, an area estimation method of the fifth embodiment will be described by using FIG. 14.

Steps S201 to S205 are the same as those in the fourth embodiment, and thus the explanation thereof is omitted here.

After step S205, the area estimation apparatus 100 judges whether the radio signal transmitting terminal 10 is staying in an area or moving from area to area (S206), and then determines the area estimation frequency (S207).

To be more precise, the area estimation frequency determination unit 160 obtains the name of a user toting the radio signal transmitting terminal 10, by referring to the radio signal transmitting terminal attribute information storage unit 121.

Instead, the area estimation frequency determination unit 160 obtains the presence area of the radio signal transmitting terminal 10, by referring to the radio signal transmitting terminal presence area storage unit 124.

Then, the area estimation frequency determination unit 160 obtains the estimation frequency corresponding to the user's name and the presence area, by referring to the area estimation frequency storage unit 126, and thereby determines the area estimation frequency.

(Effects)

According to the area estimation system and the area estimation method of the fifth embodiment, it is possible to dynamically change the area estimation frequency, by using the attribute information and the presence area of a radio signal transmitting terminal 10.

As a result, the lowest estimation frequency required for the area estimation can be adopted according to the attribute information and the presence area of the radio signal transmitting terminal 10. This leads to a reduction in the network traffic and the load on the system.

6th Embodiment

In the first embodiment, the presence area estimation unit 140 operates without consideration of the individual differences in the hardware constituting the radio signal capturing units 41*a* and 41*b*.

In a 6th embodiment, by adding a relative RSSI determination unit 170, the individual differences in the hardware are neutralized without performing a complicated calibration or the like, and thus the area is estimated.

(Area Estimation System)

Figure 19:
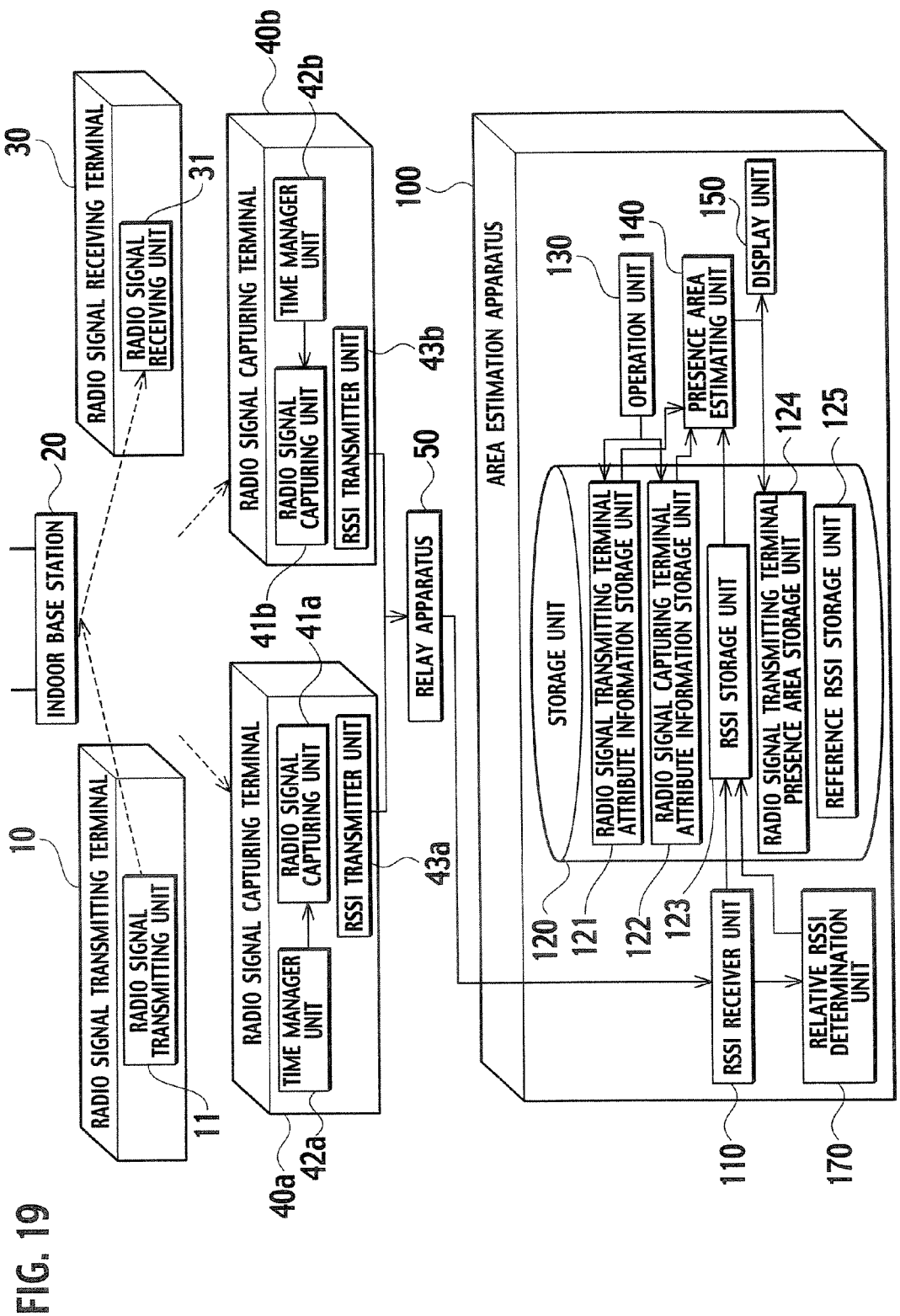
FIG. 19 is a configuration block diagram of an area estimation system of a 6th embodiment.

As shown in FIG. 19, an area estimation system of the 6th embodiment includes a radio signal transmitting terminal 10, an indoor base station 20, a radio signal receiving terminal 30, radio signal capturing terminals 40*a* and 40*b*, a relay apparatus 50 and an area estimation apparatus 100.

The radio signal transmitting terminal 10, the indoor base station 20, the radio signal receiving terminal 30, the radio signal capturing terminals 40*a* and 40*b* and the relay apparatus 50 are the same as those in the first embodiment, and thus the explanation thereof is omitted here.

The area estimation apparatus 100 includes an RSSI receiver unit 110, a storage unit 120, an operation unit 130, a presence area estimation unit 140, a display unit 150 and the relative RSSI determination unit 170.

Moreover, the storage unit 120 includes an radio signal transmitting terminal attribute information storage unit 121, an radio signal capturing terminal attribute information storage unit 122, an RSSI storage unit 123, an radio signal transmitting terminal presence area storage unit 124 and a reference RSSI storage unit 125.

The RSSI receiver unit 110, the radio signal transmitting terminal attribute information storage unit 121, the radio signal capturing terminal attribute information storage unit 122, the RSSI storage unit 123 and the radio signal transmitting terminal presence area storage unit 124, the operation unit 130 and the display unit 150 are also the same as those in the first embodiment, and thus the explanation thereof is omitted here.

The relative RSSI determination unit 170 is configured to determine a reference RSSI either for a set of each radio signal transmitting terminal and each radio signal capturing terminal, or for each radio signal capturing terminal by referring to the RSSI storage unit 123.

Alternatively, the relative RSSI determination unit 170 is configured to determine the reference RSSI either for a set of a radio signal transmitting terminal 10 and a radio signal capturing terminal existing in the seat area of a user toting the radio signal transmitting terminal 10, or for each radio signal capturing terminal.

The reference RSSI is determined by using the past records of RSSIs of any of a set of each radio signal transmitting terminal and each radio signal capturing terminal; a set of a radio signal transmitting terminal 10 and a radio signal capturing terminal existing in the seat area of a user toting the radio signal transmitting terminal; and each radio signal capturing terminal.

As the reference RSSI, it is appropriate to adopt any one of: 1) the largest value in the past records of the above three; 2) the largest N %-th value therein; and 3) the highest frequent value included in the largest N % therein.

Although N may be set freely, the appropriate setting of N is within a range of 1 to 20. The highest frequent value indicates the RSSI that has the highest frequency of appearance when the past records are viewed as the frequency distribution.

The reference value thus calculated is stored in the reference RSSI storage unit 125 in association with a radio signal transmitting terminal ID and a radio signal capturing terminal ID.

FIG. 20 shows an example of information stored in the reference RSSI storage unit 125 in a case where the reference RSSI is determined for a set of each radio signal transmitting terminal and each radio signal capturing terminal.

FIG. 21 shows an example of information stored in the reference RSSI storage unit 125 in a case where the reference RSSI is determined for each radio signal capturing terminal.

Moreover, the relative RSSI determination unit 170 is configured to receive the RSSIs obtained by the radio signal capturing units 41*a* and 41*b* through the RSSI receiver unit 110.

Then, the relative RSSI determination unit 170 is configured to calculate the relative RSSI. This relative RSSI is calculated by using the following equation.

Relative RSSI=RSSI obtained by a radio signal capturing unit−Reference RSSI

In the RSSI storage unit 123, the relative RSSI determination unit 170 stores the relative RSSI calculated by using the above equation, in association with the radio signal transmitting terminal ID, the radio signal capturing terminal ID, the RSSI obtained by the radio signal capturing terminal and the obtaining time.

FIG. 22 shows an example of information stored in the RSSI storage unit 123 in a case where the reference RSSI is determined for a set of each radio signal transmitting terminal and each radio signal capturing terminal.

FIG. 23 shows an example of information stored in the RSSI storage unit 123 in a case where the reference RSSI is determined for each radio signal capturing terminal.

The presence area estimation unit 140 is configured to estimate the area, by using the relative RSSIs stored in the RSSI storage unit 123.

The other functions of the presence area estimation unit 140 are the same as those in the first embodiment, and thus the explanation thereof is omitted here.

(Area Estimation Method)

Figure 24:
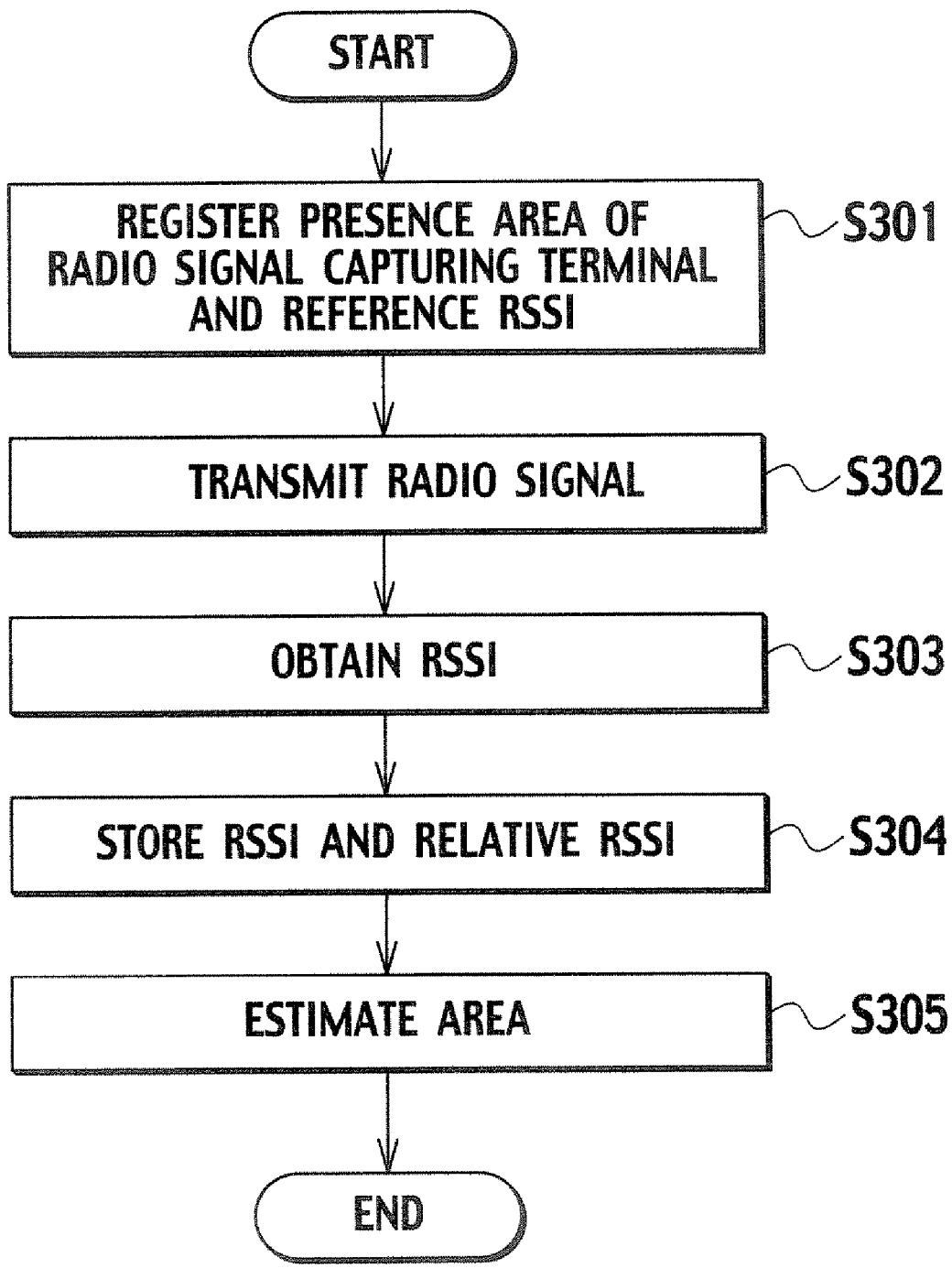
FIG. 24 is a flowchart showing an area estimation method of the 6th embodiment.

Hereinafter, an area estimation method of the 6th embodiment will be described by using FIG. 24.

In order to cause the area estimation apparatus 100 of the 6th embodiment to operate, firstly, the attribute information on and the reference RSSI of each terminal are registered (S301).

The registration of the attribute information on the terminals (the presence areas of the radio signal capturing terminals) is the same as that in the first embodiment (step S101 of FIG. 2), and thus the explanation thereof is omitted here.

The relative RSSI determination unit 170 determines the reference RSSI for a set of each radio signal transmitting terminal and each radio signal capturing terminal, by referring to the RSSI storage unit 123.

Alternatively, the relative RSSI determination unit 170 determines the reference RSSI for a set of a radio signal transmitting terminal 10 and a radio signal capturing terminal existing in the seat area of a user toting the radio signal transmitting terminal 10, by referring to the RSSI storage unit 123.

Otherwise, the relative RSSI determination unit 170 determines the reference RSSI for each radio signal capturing terminal, by referring to the RSSI storage unit 123.

The area estimation apparatus 100 stores the RSSIs thus determined in the reference RSSI storage unit 125.

Steps S302 and S303 are the same as steps S102 and S103 of FIG. 2, and thus the explanation thereof is omitted here.

After step S303, the area estimation apparatus 100 stores the RSSIs obtained from the radio signal capturing terminals 40a and 40b, and the relative RSSIs (S304).

The storage of the RSSIs is the same as that in the first embodiment (step S104 of FIG. 2), and thus the explanation thereof is omitted here.

The area estimation apparatus 100 calculates the relative RSSIs by using the RSSIs obtained by the radio signal capturing units 41a and 41b, and stores the calculated relative RSSIs in the RSSI storage 123.

Thereafter, the area estimation apparatus 100 estimates the area by using the relative RSSIs stored in the RSSI storage 123 (S305).

(Effects)

According to the area estimation system and the area estimation method of the 6th embodiment, in order to solve a problem that the variation in the obtained RSSIs occurs due to the individual differences in the hardware constituting the radio signal capturing units 41a and 41b, the reference RSSI is determined either for a set of each radio signal transmitting terminal and each radio signal capturing terminal, or for each radio signal capturing terminal.

Then, the difference between the reference RSSI and the obtained RSSI is used for the area estimation. In this way, the individual differences can be neutralized without performing a complicated calibration or the like.

In addition, the individual differences can be neutralized just by setting the reference RSSI either for a set of each radio signal transmitting terminal and each radio signal capturing terminal, or each radio signal capturing terminal so that the reference RSSI would be equal to the RSSI obtained when each radio signal capturing terminal is located at the nearest point to each radio signal transmitting terminal, that is, approximately the largest RSSI value in the past records of RSSI.

This is because the presence area estimation unit 140 determines the radio signal capturing terminal obtaining the largest RSSI as the nearest radio signal capturing terminal.

(Modified Example)

Furthermore, in the 6th embodiment, the relative RSSI determination unit 170 automatically determines the reference RSSIs.

Alternatively, an administrator can manually modify the reference RSSIs through the operation unit 130, according to the result of a calibration which is performed in advance, by referring to the reference RSSI storage unit 125.

In this method, it is necessary to perform the calibration in advance, but it is possible to set more accurate reference RSSI values, and thereby to enhance the accuracy of the area estimation.

In the 6th embodiment, an RSSI (a constant number) is used as the reference RSSI. Instead, the reference RSSI can be defined as a function using the current RSSI as an argument.

FIG. 25 shows an example of information stored in the reference RSSI storage unit 125 in a case where the function is determined for a set of each radio signal transmitting terminal and each radio signal capturing terminal.

FIG. 26 shows an example of information stored in the reference RSSI storage unit 125 in a case where the function is determined for each radio signal capturing terminal.

7th Embodiment

In the first embodiment, the presence area estimation unit 140 operates without considering a case where a plurality of indoor base stations 20 exist, and where the indoor base stations 20 use different channels respectively.

In a 7th embodiment, by adding channel switcher units 44a and 44b, an area is estimated even in an environment where there are a plurality of indoor base stations 20 using different channels respectively.

(Area Estimation System)

Figure 27:
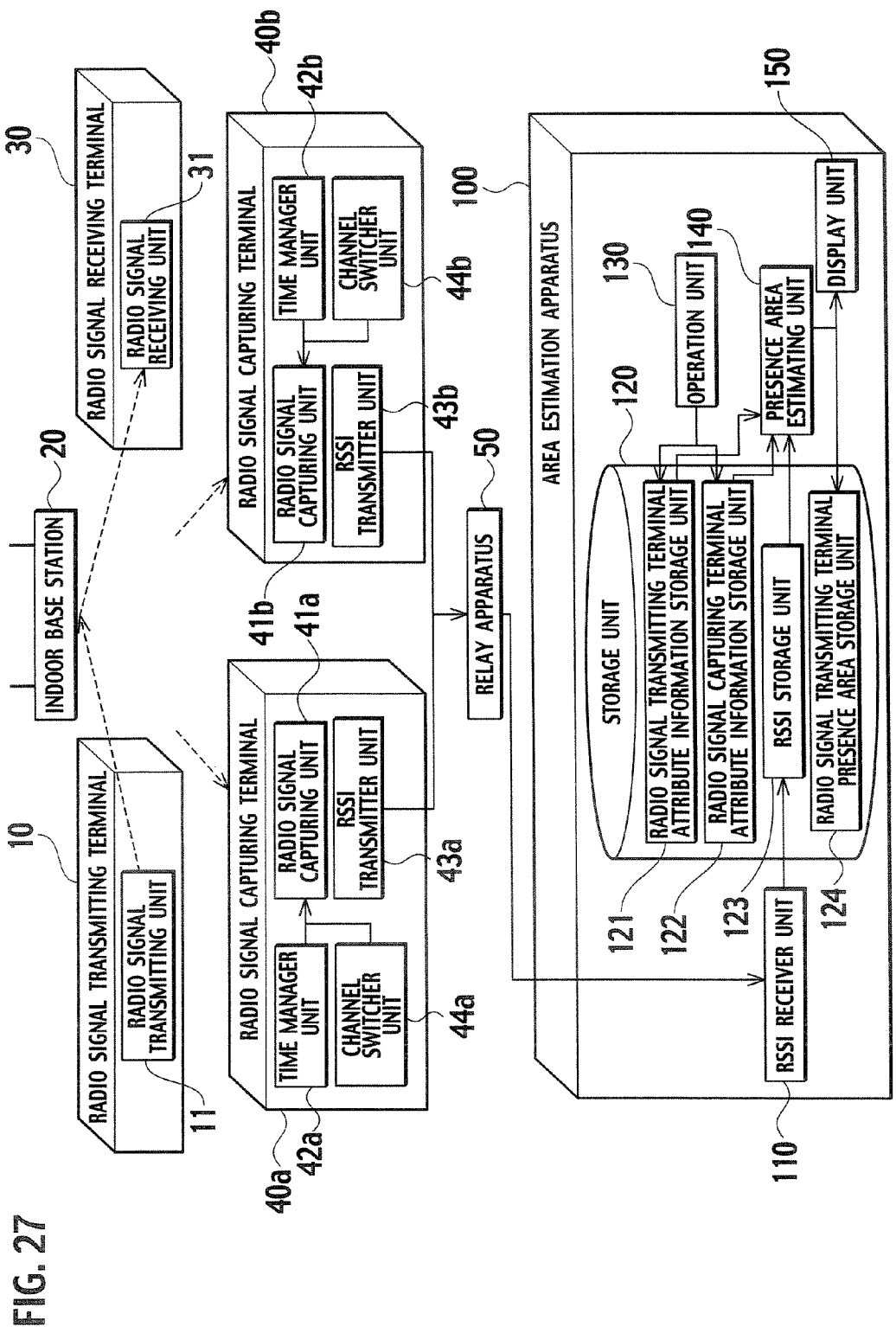
FIG. 27 is a configuration block diagram of an area estimation system of a 7th embodiment.

As shown in FIG. 27, an area estimation system of the 7th embodiment includes a radio signal transmitting terminal 10, indoor base stations 20a and 20b, a radio signal receiving terminal 30, radio signal capturing terminals 40a and 40b, a relay apparatus 50 and an area estimation apparatus 100.

The radio signal transmitting terminal 10, the indoor base stations 20a and 20b, the radio signal receiving terminal 30 and the relay apparatus 50 are the same as those in the first embodiment, and thus the explanation thereof is omitted here.

The radio signal capturing terminals 40a and 40b include radio signal capturing units 41a and 41b, time manager units 42a and 42b, RSSI transmitter units 43a and 43b and the channel switcher units 44a and 44b.

The time manager units 42a and 42b are the same as those in the first embodiment, and thus the explanation thereof is omitted here.

The channel switcher units 44a and 44b are configured to identify a channel used for transmitting radio signals from the radio signal transmitting terminal 10 to the radio signal receiving terminal 30.

It is possible to adopt any type of the following methods for setting a channel, in one of which a channel is manually set in the radio signal receiving terminal 30, and in the other of which a channel is automatically set therein.

When a channel is automatically set in the radio signal receiving terminal 30, each of the radio signal capturing terminals 40a and 40b receives a beacon signal of an indoor base station 20 used for the area estimation on each channel, and identifies the channel on which the beacon signal having an SSID (Service Set Identifier) of the area estimation system is detected (passive scan).

Instead, each of the radio signal capturing terminals 40a and 40b transmits a probe request on each channel to the indoor base stations 20a and 20b, and identifies the channel by using a probe reply from each of the indoor base stations 20a and 20b (active scan).

The number of the channels thus identified is reduced more by using any of the following two methods. In the first method, each of the radio signal capturing terminals 40a and 40b makes a connection to each of the indoor base stations 20a and 20b, and then identifies a channel on which communications can be made (hereinafter, such a channel is called a "communication-possible channel"), by transmitting a communication signal.

In the second method, each of the radio signal capturing terminals 40a and 40b obtains the RSSIs of the beacon signals, and identifies only the channels corresponding to the beacon signals which are larger than a predetermined lower limit.

Then, in a case where there are a plurality of channels used for the transmission from the radio signal transmitting terminal 10 to the radio signal receiving terminal 30, the channel switcher units 44a and 44b give instructions to the respective radio signal capturing units 41a and 41b so that the plurality of channels can be detected by switching from one channel to another at certain intervals.

The radio signal capturing units 41a and 41b are configured to switch the plurality of channels thus predetermined at certain intervals, to capture a signal transmitted on each channel from the radio signal transmitting terminal 10, and to obtain the RSSIs.

Moreover, the radio signal capturing units 41a and 41b may obtain the state of use of the communication-possible channels, and may capture a radio signal by switching only the channels actually being in use at certain intervals.

In a case where the radio signal capturing units 41a and 41b capture a signal transmitted from the radio signal transmitting terminal 10 on a certain channel, and then obtain the RSSIs, the RSSI transmitter units 43a and 43b transmit the RSSIs to the area estimation apparatus 100 either on the current channel, or on another communication-possible channel after the channel switcher units 44a and 44b switch from the former channel to the latter channel.

Meanwhile, the area estimation apparatus 100 includes an RSSI receiver unit 110, a storage unit 120, an operation unit 130, the presence area estimation unit 140 and a display unit 150.

The storage unit 120 includes an radio signal transmitting terminal attribute information storage unit 121, an radio signal capturing terminal attribute information storage unit 122, an RSSI storage unit 123 and an radio signal transmitting terminal presence area storage unit 124.

The RSSI receiver unit 110 is configured to receive a plurality of RSSIs transmitted from the RSSI transmitting units 43a and 43b, and the presence area estimation unit 140 is configured to estimate the presence area of the radio signal transmitting terminal 10 by using the plurality of RSSIs.

The other functions of the area estimation apparatus 100 are the same as those in the first embodiment, and thus the explanation thereof is omitted here.

(Area Estimation Method)

Figure 28:
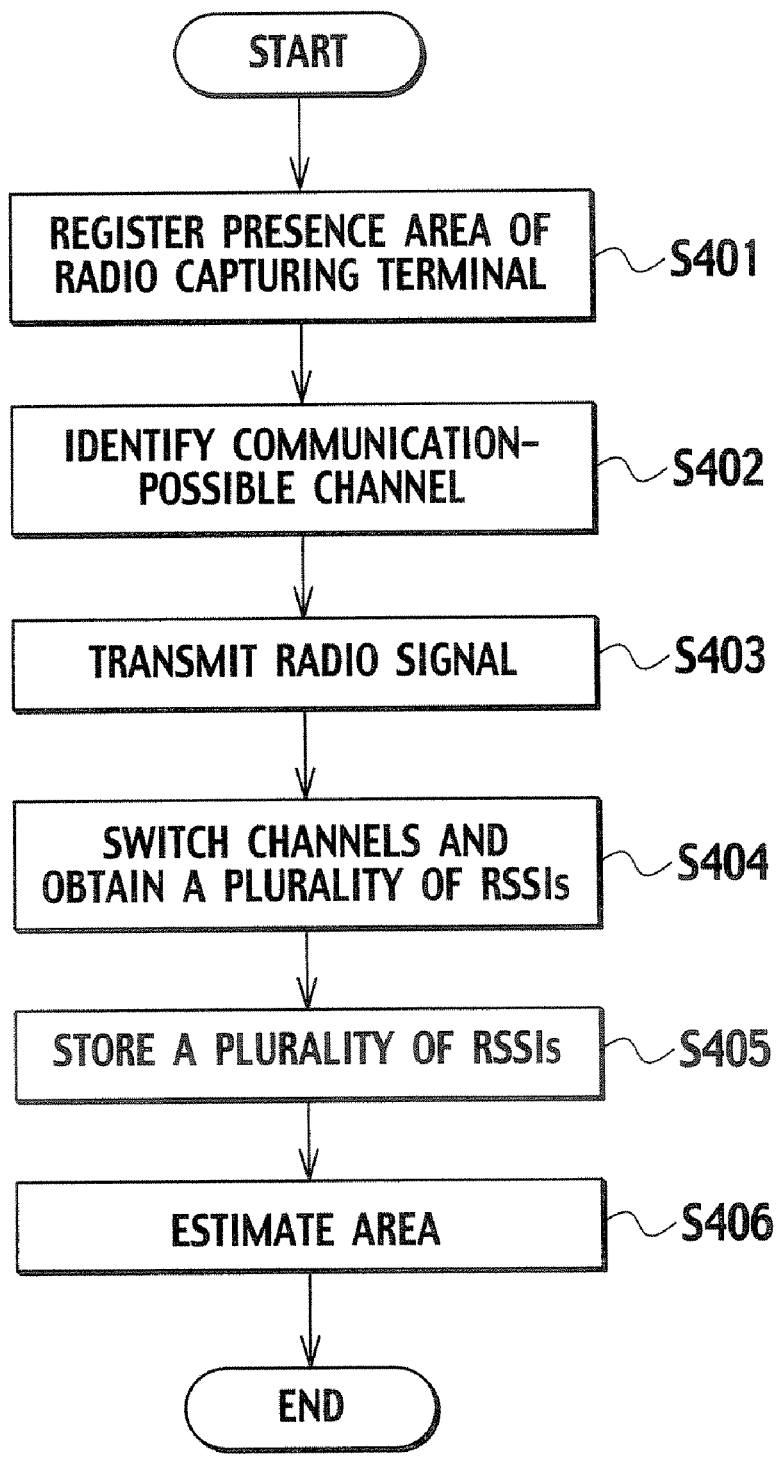
FIG. 28 is a flowchart showing an area estimation method of the 7th embodiment.

Hereinafter, an area estimation method of the 7th embodiment will be described by using FIG. 28.

In order to cause the area estimation apparatus 100 of the 7th embodiment to operate, firstly, the attribute information on terminals is registered (S401).

The registration of the attribute information on the terminals (the presence areas of the radio signal capturing terminals) is the same as that in the first embodiment (step S101 of FIG. 2), and thus the explanation thereof is omitted here.

Thereafter, the radio signal capturing terminals 40a and 40b identify a channel used for transmitting a radio signal from the radio signal transmitting terminal 10 to the radio signal capturing terminal 30 (S402).

Step S403 is the same as step S102 of FIG. 2, and thus the explanation thereof is omitted here.

Subsequently, the radio signal capturing terminals 40a and 40b capture a signal on a communication-possible channel, and obtain the RSSIs (S404).

At this time, in a case where there are a plurality of communication-possible channels, the channel switcher units 44a and 44b switch the communication-possible channels at certain intervals. Here, the certain interval is, for example, 1 second or the like.

At the intervals of such a time length, the radio signal capturing terminals 40a and 40b capture signals transmitted from a radio signal transmitting terminal 10 on each of the channels, and obtain the RSSIs.

Thereafter, the area estimation apparatus 100 stores a plurality of RSSIs obtained from the radio signal capturing terminals 40a and 40b (S405), and estimates the presence area of the radio signal transmitting terminal 10 by using the plurality of RSSIs (S406).

(Effects)

According to the area estimation system and the area estimation method of the 7th embodiment, it is possible to properly estimate the area in an environment in which there are a plurality of base stations (access points) using different channels respectively, and in which the communication areas thereof overlap one another.

This is because, even in a case where a handoff occurs due to the movement of the radio signal transmitting terminal 10 from the area of one base station to the area of another base station, the radio signal capturing terminals 40a and 40b switch the communication-possible channels at certain intervals, capture signals on the respective channels, and obtain the RSSIs. By using these RSSIs, the presence area can be properly estimated.

In addition, the radio signal capturing units 41a and 41b may obtain the state of use of the communication-possible channels, may capture radio signals by switching only the channels actually being in use at certain intervals, and thereby may obtain a plurality of RSSIs.

By using this method, even in a case where there are a plurality of communication-possible channels, the state of use of the channels is checked, and the RSSIs are obtained on only the respective channels actually being in use at the certain intervals.

Accordingly, it is possible to eliminate the unnecessary switching of the channels, and thereby to estimate the area in real time, even more quickly than otherwise.

(Modified Example)

Hereinafter, a modified example of the 7th embodiment will be described.

The area estimation system of the foregoing embodiment handles only the communication-possible channels.

However, it is also possible to capture a signal on a channel on which only a beacon signal can be detected, as is the case with the communication-possible channels.

In this case, although the signal can be captured, the obtained RSSI cannot be transmitted on the concerned channel. For this reason, it is necessary to manage the channels by dividing the channels into two categories of channels on which only a beacon signal can be detected, and of communication-possible channels, and to transmit the obtained RSSIs by using the communication-possible channel.

The area estimation system of the foregoing embodiment switches the communication-possible channels at certain intervals.

An capturing time period on each channel may be changed according to certain conditions. Three examples of the certain conditions will be described below.

The first condition is the strength of a beacon signal or a probe reply signal transmitted from the base stations 20*a* and 20*b*. In other words, the stronger the signal is, the longer the capturing time period is set.

In a case of the second condition, two modes, that is, a scan mode and a capture mode are prepared, and a determination is made on whether or not to switch to the capture mode according to whether or not a signal transmitted from the radio signal transmitting terminal 10 is captured in the scan mode.

In this case, the capturing time Ts and Tc are set for the scan mode and the capture mode, respectively.

Ts is desirably set to the shortest time period during which at least one signal can be captured. For example, Ts is set to be the shorter one of 1 second, and of a time period during which one signal is captured, or the like.

Tc is desirably set to a time period needed for the area estimation. For example, Tc is set to 2 to 3 seconds, or the like.

There are also two methods for switching between the scan mode and the capture mode, and they are an intermittent captureion method and a weighed captureion method.

In the intermittent captureion method, firstly the captureion is carried out on all the communication-possible channels in the scan mode, and then signals are captured in the capture mode only on the channels on each of which the captureion of a signal from the radio signal transmitting terminal 10 has succeeded.

Figure 29:
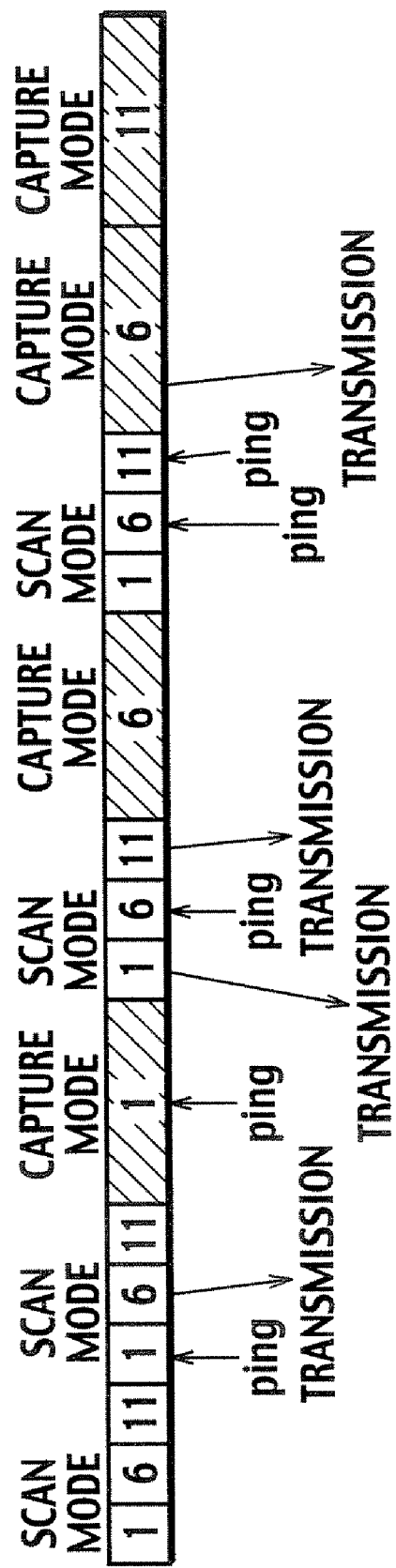
FIG. 29 is a diagram for explaining an intermittent captureion method in the area estimation system of the 7th embodiment.

FIG. 29 shows an example of the intermittent captureion method in a case where the communication-possible channels are 1, 6 and 11 channels.

In FIG. 29, any signal cannot be captured in the first attempt of the captureion on each channel in the scan mode. For this reason, the captureions are again carried out sequentially on all the channels in the second attempt.

Then, a radio signal from the radio signal transmitting terminal 10 is captured only on the channel 1.

Thus, in the capture mode, the radio signal from the radio signal transmitting terminal 10 is captured only on the channel 1.

In the case of the weighed captureion method, in the scan mode, the captureion is carried out on each communication-possible channel in series.

Once the captureion of a radio signal from the radio signal transmitting terminal 10 succeeds on one channel, the radio signal is continuously captured on the channel in the capture mode.

Figure 30:
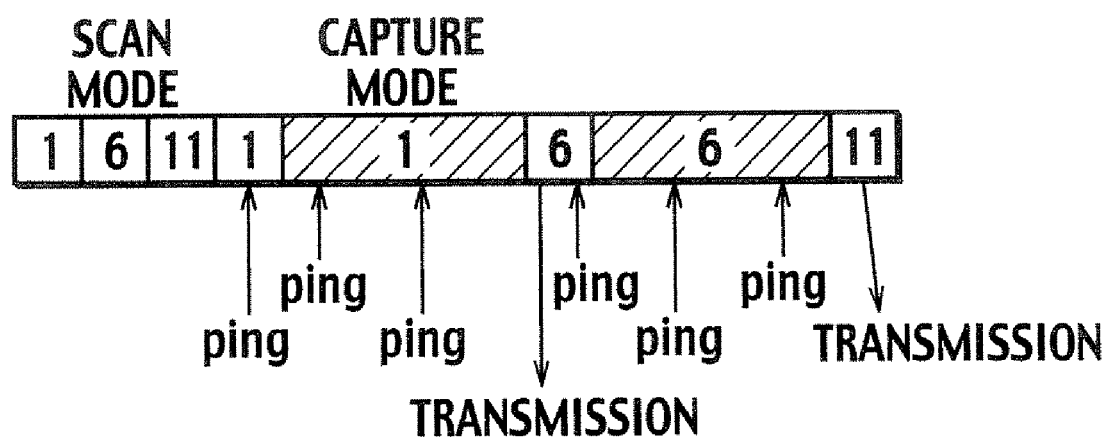
FIG. 30 is a diagram for explaining a weighted captureion method in the area estimation system of the 7th embodiment.

FIG. 30 shows an example of the weighted captureion method in a case where the communication-possible channels are 1, 6 and 11 channels.

In FIG. 30, the captureion is carried out on each channel in series, and the captureion of a signal from the radio signal transmitting terminal 10 succeeds on the channel 1 in the second round of attempts.

Thus, continuously, the radio signal is captured on the channel 1 in the capture mode.

In the case of the third condition, by means of beacon signals or the like transmitted from the indoor base stations 20*a* and 20*b*, the radio signal capturing terminals 40*a* and 40*b* periodically receive information on the number of the radio signal transmitting terminals 10 currently connected to the indoor base stations 20*a* and 20*b*.

Then, the radio signal capturing terminals 40*a* and 40*b* capture signals only on the channel used by an indoor base station currently connected to one or more radio signal transmitting terminals.

In order to add, to a beacon signal, information on the number of radio signal transmitting terminals currently connected to the indoor base station, the beacon signal needs to be modified.

In a case of IEEE802.11e and the like, however, this information is included as one of the standard specifications.

Other Embodiment

Although the present invention has been described by using the embodiments hereinabove, it should not be understood that the present invention is limited to the descriptions and drawings contained in this disclosure.

It is obvious to those skilled in the art from this disclosure how to provide various alternative embodiments, examples and techniques to which the present invention is applied.

For example, although it has been assumed that the radio signal transmitting terminal 10 communicate with the radio signal capturing terminal 30 through the wireless LAN network in the area estimation system of each of the foregoing embodiments, an active tag can also be used.

In this case, a radio tag is used as the radio signal transmitting terminal 10, and radio tag readers are used as the radio signal receiving terminal 30 and the radio signal capturing terminals 40*a* and 40*b*.

Furthermore, the area estimation system of the present invention may use Bluetooth.

In this case, a Bluetooth terminal functions as any of the radio signal transmitting terminal 10, the radio signal receiving terminal 30, and the radio signal capturing terminals 40*a* and 40*b*.

Additional advantages and modifications will readily occur to those skilled in the art. Therefore, the invention in its broader aspects is not limited to the specific details and the representative embodiments shown and described herein. Accordingly, various modifications may be made without departing from the scope of the general inventive concept as defined by the appended claims and their equivalents.

What is claimed is:

1. An area estimation system, comprising:
    a radio signal transmitting terminal of which a presence area is unknown, the radio signal transmitting terminal including a radio signal transmitting unit configured to transmit a radio signal addressed to a radio signal receiving terminal;
    a radio signal capturing terminal of which a presence area is known, the radio signal capturing terminal including a radio signal capturing unit configured to capture the radio signal addressed to the radio signal receiving terminal, which is different from the radio signal capturing terminal, transmitted from the radio signal transmitting terminal, to obtain an RSSI for indicating a strength of the radio signal addressed to the radio signal receiving terminal;
    an area estimating unit including an RSSI receiver unit configured to receive the RSSI from the radio signal capturing terminal, an ID of the radio signal transmitting terminal, and an ID of the radio signal capturing terminal;
    an RSSI storage unit configured to store the RSSI from the radio signal capturing terminal, the ID of the radio signal transmitting terminal and the ID of the radio signal capturing terminal in association with one another; and
    a presence area estimating unit configured to estimate the presence area of the radio signal transmitting unit, by using the RSSI which is stored in the RSSI storage unit.

2. The area estimation system according to claim 1, wherein, when a plurality of radio signal capturing units capture a radio signal transmitted from the radio signal transmitting unit, the presence area estimating unit is configured to estimate a presence area of the radio signal capturing unit obtaining the largest RSSI as the presence area of the radio signal transmitting unit.

3. The area estimation system according to claim 1, further comprising a time manager unit configured to manage time information;
wherein the RSSI storage unit is configured to store the RSSI, the radio signal transmitting unit ID, the radio signal capturing unit ID, and time information for indicating a time when the radio signal capturing unit captures the radio signal, the time information obtained from the time manager unit.

4. The area estimation system according to claim 3, wherein the presence area estimating unit is configured to estimate the presence area of the radio signal transmitting unit, by using one or more RSSIs including a past record of the RSSI obtained by the radio signal capturing unit.

5. The area estimation system according to claim 3, wherein the presence area estimating unit is configured to estimate the presence area of the radio signal transmitting unit, by using the latest RSSI obtained by the radio signal capturing unit.

6. The area estimation system according to claim 3, wherein the presence area estimating unit is configured to estimate a presence area of the radio signal capturing unit obtaining the largest RSSI among the RSSIs obtained at the same time as or the nearest time to a time when the certain radio signal receiving terminal receives the radio signal, as the presence area of the radio signal transmitting unit.

7. The area estimation system according to claim 3, further comprising an RSSI time variation comparing unit configured to calculate a time variation in a column of RSSIs of each radio signal transmitting unit which have been obtained by each of the radio signal capturing units, wherein
the presence area estimating unit is configured to estimate the presence area of the radio signal transmitting unit by using the time variation.

8. The area estimation system according to claim 1, further comprising a relative RSSI determining unit configured to determine a reference RSSI for either a set of each radio signal transmitting unit and each radio signal capturing unit, or each of the radio signal capturing unit, by using past records of the RSSIs stored in the RSSI storage unit, to store the reference RSSI in a reference RSSI storage unit, and to determine, as a relative RSSI, a difference between the RSSI obtained by the radio signal capturing unit, and the reference RSSI, wherein
the presence area estimation is configured to estimate the presence area of the radio signal transmitting unit by using the relative RSSI.

9. The area estimation system according to claim 1, further comprising a channel switcher unit configured to instruct the radio signal capturing unit to perform a detection on a plurality of channels by switching from one channel to another at certain intervals, when there are the plurality of channels used for the radio signal transmission from the radio signal transmitting unit to the radio signal receiving unit, wherein
the radio signal capturing unit is configured to capture the radio signals transmitted respectively on the plurality of channels, and to obtains the one or more RSSIs of the radio signals; and
the presence area estimating unit is configured to estimate the presence area of the radio signal transmitting unit, by using the one or more RSSIs.

10. The area estimation system according to claim 9, wherein the radio signal capturing unit is configured to obtain a state of use of channels, on which communications can be made, to capture the radio signals by switching only the channels being in use from one channel to another at certain intervals, and to obtain the one or more RSSIs.

11. An area estimation system, comprising:
a radio signal transmitting unit configured to transmit a radio signal to a certain radio signal receiving terminal, a presence area of the radio signal transmitting unit being unknown;
a radio signal capturing unit configured to capture the radio signal transmitted from the radio signal transmitting unit, to obtain an RSSI for indicating a strength of the captured radio signal, a presence area of the radio signal capturing unit being known;
an RSSI receiver unit configured to receive the RSSI, a radio signal transmitting unit ID for uniquely identifying the radio signal transmitting unit, and a radio signal capturing unit ID for uniquely identifying the radio signal capturing unit;
an RSSI storage unit configured to store the RSSI, the radio signal transmitting unit ID and the radio signal capturing unit ID in association with one another;
a presence area estimating unit configured to estimate the presence area of the radio signal transmitting unit, by using the RSSI which is obtained by the radio signal capturing unit and stored in the RSSI storage unit;
a time manager unit configured to manage time information; and
a confidence factor determining unit configured to calculate a feature quantity from a column of RSSIs of each radio signal transmitting unit which have been obtained by each of radio signal capturing units, and to calculate a confidence factor for specifying a degree of difference in the feature quantity, wherein
the RSSI storage unit is configured to store time information for indicating a time when the radio signal capturing unit captures the radio signal, the time information having been obtained from the time manager unit, and
the presence area estimating unit is configured to estimate the presence area of the radio signal transmitting unit by using the confidence factor.

12. An area estimation system, comprising:
a radio signal transmitting unit configured to transmit a radio signal to a certain radio signal receiving terminal, a presence area of the radio signal transmitting unit being unknown;
a radio signal capturing unit configured to capture the radio signal transmitted from the radio signal transmitting unit, to obtain an RSSI for indicating a strength of the captured radio signal, a presence area of the radio signal capturing unit being known;
an RSSI receiver unit configured to receive the RSSI, a radio signal transmitting unit ID for uniquely identifying the radio signal transmitting unit, and a radio signal capturing unit ID for uniquely identifying the radio signal capturing unit;
an RSSI storage unit configured to store the RSSI, the radio signal transmitting unit ID and the radio signal capturing unit ID in association with one another;
a presence area estimating unit configured to estimate the presence area of the radio signal transmitting unit, by using the RSSI which is obtained by the radio signal capturing unit and stored in the RSSI storage unit; and an area estimation frequency determining unit configured to determine an area estimation frequency on the basis of any one of the presence area of the radio signal transmitting unit and attribute information on the radio signal transmitting unit.

13. The area estimation system according to claim 12, further comprising:

a staying-moving judgment unit configured to judge whether the radio signal transmitting unit is staying in an area or moving between areas, by using either a past record of the RSSI stored in the RSSI storage unit, or a past record of the presence area of the radio signal transmitting unit; and an RSSI-record-use number determining unit configured to determine the number of past records of the RSSIs to be used for the area estimation, on the basis of a judgment result of the staying-moving judgment unit, wherein the area estimation frequency determining unit is configured to determine the area estimation frequency on the basis of the judgment result of the staying-moving judgment unit.

14. The area estimation system according to claim 12, wherein the area estimation frequency determining unit is configured to determine the area estimation frequency according to a variation in a confidence factor for specifying a degree of difference between feature quantities calculated from a column of the RSSIs of each radio signal transmitting unit obtained by each radio signal capturing unit.

15. The area estimation system according to claim 12, further comprising an area estimation frequency storage unit configured to store the estimation frequency corresponding to at least one of the attribute information on the radio signal transmitting unit, the attribute information on the radio signal capturing unit, and the presence area of the radio signal transmitting unit, wherein the area estimation frequency determining unit is configured to determine the area estimation frequency, by obtaining, from the area estimation frequency storage unit, the estimation frequency corresponding to at least one of the attribute information on the radio signal transmitting unit obtained from a radio signal transmitting means attribute information storage unit, the attribute information on the radio signal capturing unit obtained from a radio signal capturing terminal attribute information storage unit, and the presence area of the radio signal transmitting unit obtained from a radio signal transmitting unit presence area storage unit.

16. An area estimation method in an area estimation system including a radio signal transmitting terminal of which a presence area is unknown, a radio signal capturing terminal of which a presence area is known, and an area estimating unit, the area estimation method comprising:

transmitting, at the radio signal transmitting terminal, a radio signal addressed to a radio signal receiving terminal;

capturing, at the radio signal capturing terminal, the radio signal addressed to the radio signal receiving terminal, which is different from the radio signal capturing terminal, transmitted by the radio signal transmitting unit, and obtaining an RSSI for indicating a strength of the radio signal addressed to the radio signal receiving terminal;

receiving, at the area estimating unit, an RSSI from the radio signal capturing terminal, an ID of the radio signal transmitting terminal and an ID of the radio signal capturing terminal, storing, at the area estimating unit, the RSSI from the radio signal capturing terminal, the ID of the radio signal transmitting terminal, and the ID of the radio signal capturing terminal, in association with one another; and estimating the presence area of the radio signal transmitting terminal, by using the stored RSSI.

* * * * *